(12) United States Patent
Gan et al.

(10) Patent No.: US 12,477,594 B2
(45) Date of Patent: Nov. 18, 2025

(54) ASSOCIATING REMOTE UE WITH RELAY UE IN 5GC

(71) Applicant: Telefonaktiebolaget LM Ericsson (publ), Stockholm (SE)

(72) Inventors: Juying Gan, Shanghai (CN); Zhang Zhang, Beijing (CN); Congchi Zhang, Shanghai (CN); Zhang Fu, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 399 days.

(21) Appl. No.: 17/921,766

(22) PCT Filed: Apr. 30, 2021

(86) PCT No.: PCT/CN2021/091448
§ 371 (c)(1),
(2) Date: Oct. 27, 2022

(87) PCT Pub. No.: WO2021/223676
PCT Pub. Date: Nov. 11, 2021

(65) Prior Publication Data
US 2023/0164854 A1    May 25, 2023

(30) Foreign Application Priority Data

May 5, 2020    (WO) ................ PCT/CN2020/088602

(51) Int. Cl.
*H04W 76/10*    (2018.01)
*H04W 60/04*    (2009.01)
*H04W 68/02*    (2009.01)

(52) U.S. Cl.
CPC ........... *H04W 76/10* (2018.02); *H04W 60/04* (2013.01); *H04W 68/02* (2013.01)

(58) Field of Classification Search
CPC ..... H04W 76/10; H04W 60/04; H04W 68/02; H04W 68/00; H04W 88/04; H04W 40/22; H04W 76/14; H04W 8/005; H04W 48/16
See application file for complete search history.

(56) References Cited

U.S. PATENT DOCUMENTS

2016/0192422 A1\*    6/2016    Liu .................... H04W 36/033
                                                          370/329
2017/0318600 A1    11/2017    Shi et al.
(Continued)

FOREIGN PATENT DOCUMENTS

| CN | 102333330 A | 1/2012 |
| CN | 107006013 A | 8/2017 |

(Continued)

OTHER PUBLICATIONS

Extended European Search Report for European Patent Application No. 21800495.0 mailed Sep. 8, 2023, 15 pages.
(Continued)

*Primary Examiner* — Thai Nguyen
(74) *Attorney, Agent, or Firm* — Sage Patent Group

(57) ABSTRACT

Methods of operating a radio access network node and a core network node to link a remote user equipment, RMUE, device to a relay user equipment, RLUE, device in a communications network are described. The radio access network node operates to receive a message that includes information corresponding to either the RMUE device or the RLUE device having a connection that is established between the radio access network node and the corresponding one of the RMUE device or the RLUE device and that uses a first access and mobility management function, AMF. The radio access network node further operates to link the RMUE device to the RLUE device using the first AMF. The core network node operates to receive a message that a first
(Continued)

AMF includes data corresponding to the RLUE device and links the RMUE device to the RLUE device based on the message.

20 Claims, 21 Drawing Sheets

(56) References Cited

U.S. PATENT DOCUMENTS

| | | | |
|---|---|---|---|
| 2020/0008173 A1 | 1/2020 | Kim et al. | |
| 2020/0015192 A1 | 1/2020 | Chun | |
| 2020/0091991 A1 | 3/2020 | Fujishiro et al. | |

FOREIGN PATENT DOCUMENTS

| | | | | |
|---|---|---|---|---|
| CN | 108141751 A | | 6/2018 | |
| CN | 109672708 A | | 4/2019 | |
| CN | 110249670 A | | 9/2019 | |
| WO | 2018067956 A1 | | 4/2018 | |
| WO | 2018199672 A1 | | 11/2018 | |
| WO | 2018216774 A1 | | 11/2018 | |
| WO | WO-2020072652 A1 | * | 4/2020 | ............ H04W 12/06 |

OTHER PUBLICATIONS

Huawei et al., "Resolution of Solution#7's ENs," S2-2000494, SA WG2 Meeting #136AH, Incheon, South Korea, Jan. 13-17, 2020, 11 pages.
3GPP TR 23.752 V0.3.0, "3rd Generation Partnership Project; Technical Specification Group Services and System Aspects; Study on system enhancement for Proximity based Services (ProSe) in the 5G System (5GS) (Release 17)," Jan. 2020, 70 pages.
Sony, "Paging via Relay," R2-1704824, 3GPP TSG RAN WG2 Meeting #98, Hangzhou, China, May 15-19, 2017, 4 pages.
Office Action for Japanese Patent Application No. 2022-567625 mailed Oct. 30, 2023, 7 pages.
Office Action for Chinese Patent Application No. 202180033317.3 dated Jan. 2, 2025, 10 pages.
International Search Report and Written Opinion of the International Searching Authority for PCT International Application No. PCT/CN2021/091448 dated Jul. 26, 2021.
Mediatek Inc., "FS_5G_ProSe: Security aspects of L2 relay," S2-2000785, SA WG2 Meeting #136AH, Incheon, Korea, Jan. 13-17, 2020, 4 pages.
Chinese Office Action and Supplemental Search Report, Chinese Patent Application No. 202180033317.3, mailed Jul. 31, 2025, 14 pages.

* cited by examiner

Radio Access Network (RAN)
Node Operations

Core Network (CN) Node
Operations

US 12,477,594 B2

ASSOCIATING REMOTE UE WITH RELAY UE IN 5GC

CROSS REFERENCE TO RELATED APPLICATIONS

This application is a 35 U.S.C. § 371 national stage application of PCT International Application No. PCT/CN2021/091448 filed on Apr. 30, 2021, which itself is a continuation of PCT International Application No. PCT/CN2020/088602, filed May 5, 2020, the disclosures and contents of which are incorporated by reference herein in their entireties.

The present disclosure relates generally to communications, and more particularly to communication methods and related devices and nodes supporting wireless communications.

BACKGROUND

A remote user equipment (Remote UE) may communicate with a wireless communication network (e.g., a 5GC communications network) by exchanging communications through a relay user equipment (Relay UE). The Relay UE comprises a Layer 2 relay in which the Relay UE supports Indirect 3GPP Communication between the Remote UE and the wireless communication network. Thus, indirect signaling and communication between the Remote UE and the wireless communication network occurs, where the Relay UE is between the Remote UE and the wireless communication network.

In this setup, paging signaling directed towards the Remote UE is initially received and processed by the Relay UE. In some implementations, the Relay UE accomplishes this by monitoring its own paging offset (PO) only and paging for the Remote UE is sent from the wireless network in the Relay UE's PO. However, this implementation requires that the wireless communication network needs to link, or associate, the Remote UE with the Relay UE. Thus, a solution is needed to efficiently link or associate the Remote UE with the Relay UE at the wireless communication networks to enable efficient paging of the Remote UE.

SUMMARY

According to some embodiments, a method of operating a radio access network node to link a remote user equipment, RMUE, device to a relay user equipment, RLUE, device in a communications network is described. The method includes receiving a message from either of the RMUE device or the RLUE device that includes information corresponding to either the RMUE device or the RLUE device having a connection that is established between the radio access network node and the corresponding one of the RMUE device or the RLUE device and that uses a first access and mobility management function, AMF. The method further includes linking the RMUE device to the RLUE device using the first AMF.

According to some embodiments, a method of operating a core network node to link a remote user equipment, RMUE, device to a relay user equipment, RLUE, device in a communications network. The method includes receiving, from a radio access network node and into a core network, a message that a first AMF includes data corresponding to a RLUE device. The method further includes linking the RMUE device to the RLUE device based on the message.

BRIEF DESCRIPTION OF THE DRAWINGS

The accompanying drawings, which are included to provide a further understanding of the disclosure and are incorporated in and constitute a part of this application, illustrate certain non-limiting embodiments of present disclosure. In the drawings.

DETAILED DESCRIPTION

The present disclosure will now be described more fully hereinafter with reference to the accompanying drawings, in which examples of embodiments of the present disclosure are shown. Present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
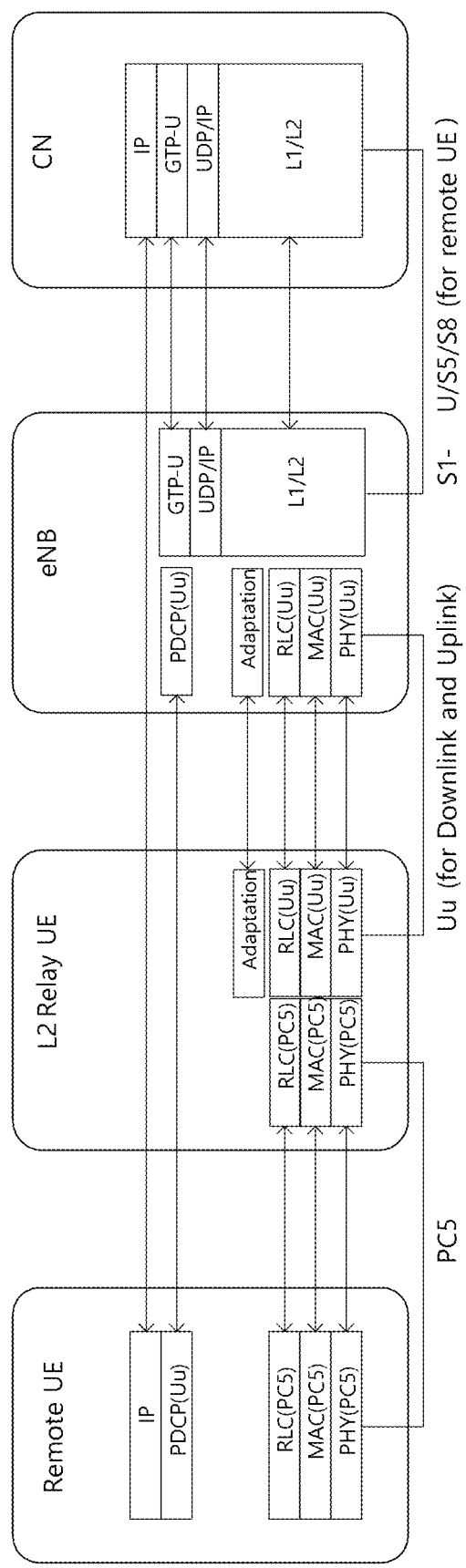
FIG. 1 is a block diagram illustrating a user plane radio protocol stack for a layer 2 evolved UE-to-Network Relay.
Figure 2:
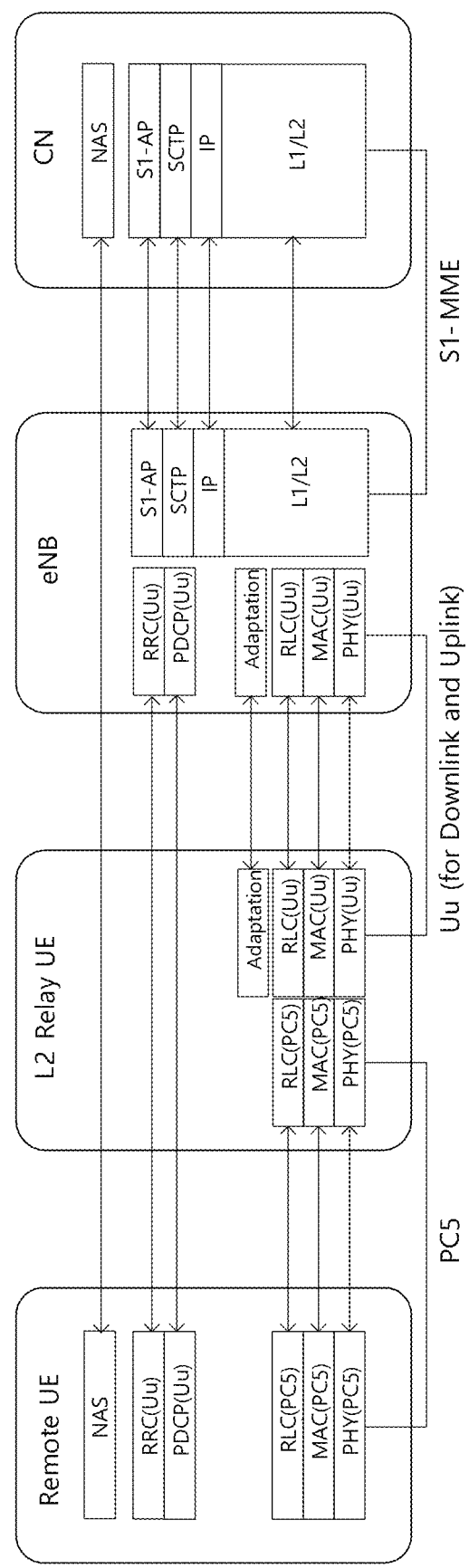
FIG. 2 is a block diagram illustrating a control plane radio protocol stack for layer 2 evolved UE-to-Network Relay.

In 3GPP 15, a layer 2 evolved UE-to-Network Relay is studied in 3GPP TR 36.746 (Rel-15) and 3GPP TR 23.733 but is not included in any normative specification. The remote UE's user plane and control plane data are relayed above Radio Link Control (RLC) via the UE-to-Network Relay UE. Packet Data Convergence Protocol (PDCP) and Radio Resource Control (RRC) are terminated between the evolved Remote UE and the eNB while RLC, Medium Access Control (MAC) and Physical Layer (PHY) are terminated in each hop. The user plane protocol stack and the control plane protocol stack are shown in FIG. 1 and FIG. 2. The adaptation layer between the evolved UE-to-Network Relay UE and the eNB is able to differentiate between Uu bearers of a particular evolved Remote UE. Different evolved Remote UEs and different Uu bearers of the evolved Remote UE are indicated by additional information (e.g. UE IDs and bearer IDs) included in adaptation layer header which is added to PDCP Protocol Data Unit (PDU). The adaptation layer can be considered as part of PDCP sublayer or a separate new layer between PDCP sublayer and RLC sublayer. One functionality of the adaptation layer is mapping bearers associated with similar Quality of Service (QoS) characteristics into the same logical channel (LCH) in the Uu interface between the layer 2 evolved UE-to-Network Relay and the gNB, the bearers may target one or more remote UE(s) or the layer 2 evolved UE-to-Network Relay. In the PC5 interface, different Uu bearers of an evolved Remote UE are distinguished by different sidelink Logical Channel IDs (LCIDs).

Figure 3:
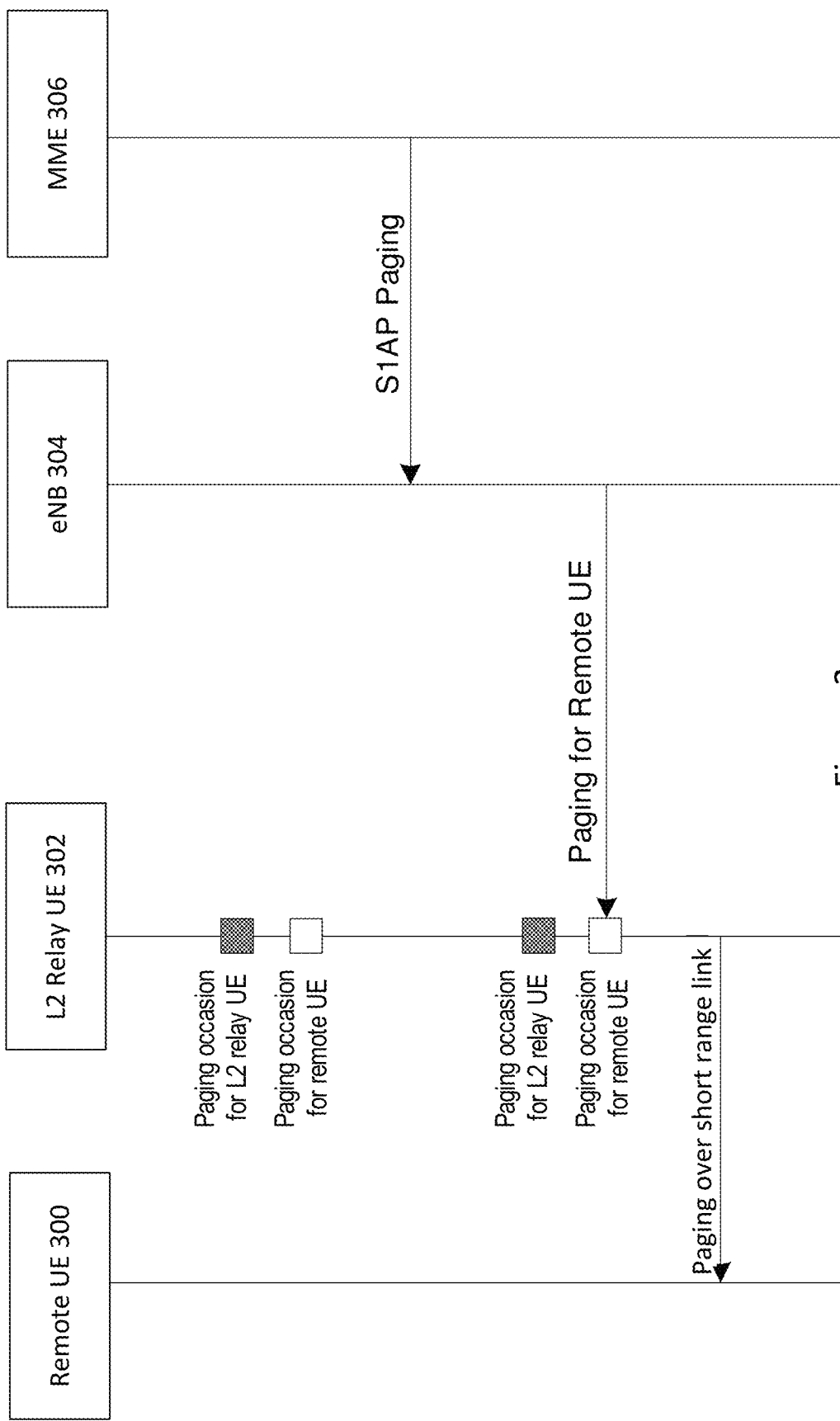
FIG. 3 is a signaling diagram illustrating an Option 2 paging procedure for an evolved ProSe Remote UE.

In TR 36.746, three paging options are studied, Paging Option-1 does not work for Out of Coverage cases, thus it is not discussed herein. Paging Option-2 assumes that Remote UE and Relay UE are not linked in the Core Network, while Paging Option-3 requires UE and Relay UE be linked in the Core Network. FIG. 3 illustrates the solution proposed in Paging Option 2. The evolved Proximity Services (ProSe) UE-to-Network Relay UE 302 monitors its linked evolved ProSe Remote UE's 300 Paging Occasion (PO) in addition to its own PO. The evolved ProSe Remote UE 300 does not need to attempt paging reception over downlink while linked to the evolved ProSe UE-to-Network Relay UE 302. The evolved ProSe UE-to-Network Relay UE 302 may need to monitor multiple paging occasions. The evolved ProSe UE-to-Network Relay UE 302 has to know the paging occasion of the evolved ProSe Remote UE 300 and has to decode a paging message and determine which evolved ProSe Remote UE 300 the paging is for. Also, the evolved ProSe UE-to-Network Relay UE 302 may need to relay the evolved ProSe Remote UE's 300 paging over short range link.

Paging Option-2 advantageously is commonly applicable to both when the evolved ProSe Remote UE 300 is in and out of E-UTRAN coverage. The evolved ProSe Remote UE 300 does not need to attempt paging reception over DL while linked to the evolved ProSe UE-to-Network Relay UE 302. This is more power efficient for the evolved ProSe Remote UE 300. In addition, there is no need for the network to know whether the evolved ProSe Remote UE 300 and the evolved ProSe UE-to-Network Relay UE 302 are linked or associated. However, this solution requires that the evolved ProSe UE-to-Network Relay UE 302 needs to monitor multiple POs. This is less power efficient for the evolved ProSe UE-to-Network Relay UE 302 as the power consumption may increase depending on the number of evolved ProSe Remote UEs 300 linked to the evolved ProSe UE-to-Network Relay UE 302. In addition, the evolved ProSe UE-to-Network Relay UE 302 needs to relay evolved ProSe Remote UE's 300 paging over short range link. This causes additional power consumption for the evolved ProSe UE-to-Network Relay UE 302 and additional use of SL resource.

Figure 4:
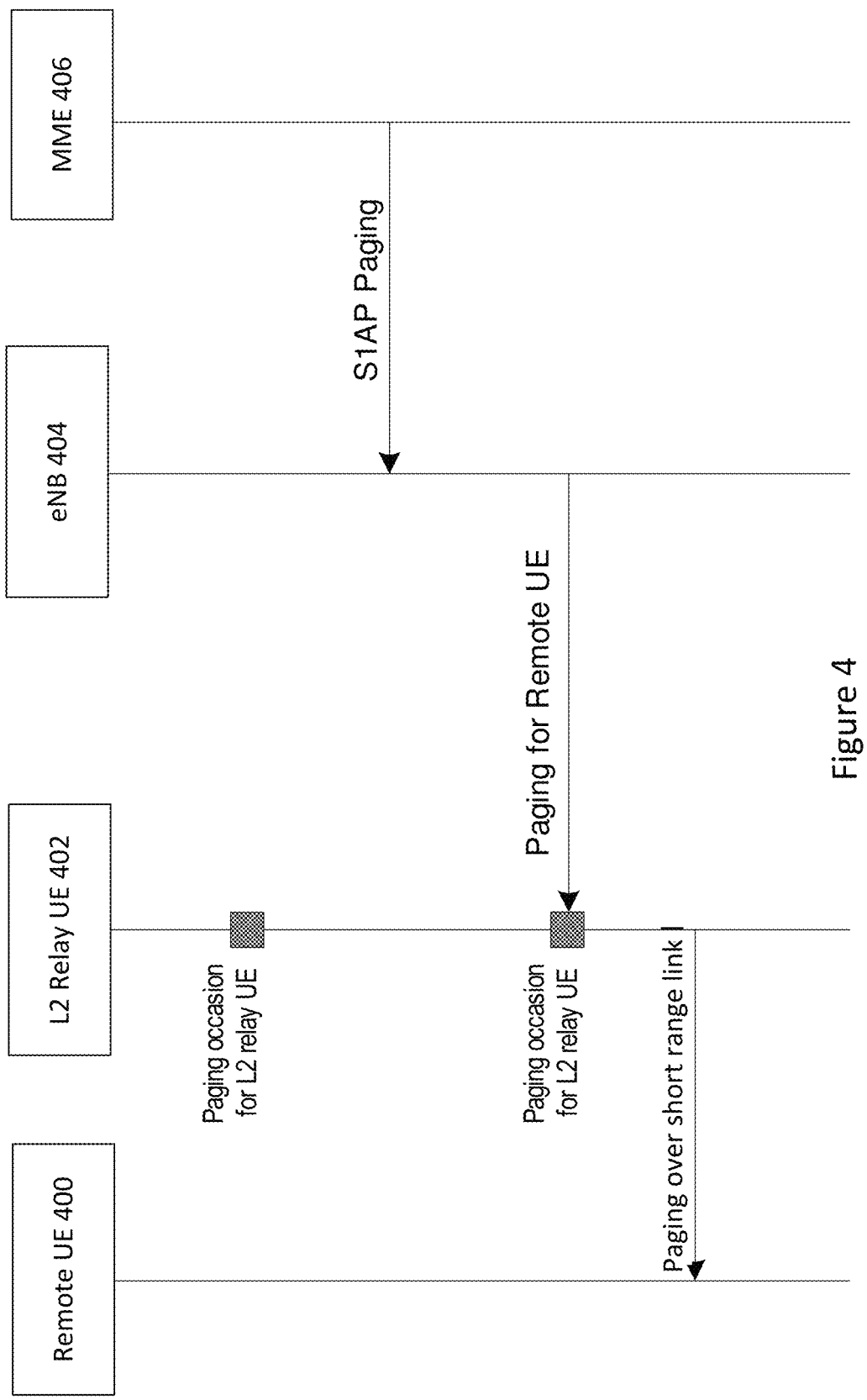
FIG. 4 is a signaling diagram illustrating an Option 3 paging procedure of an evolved ProSe Remote UE.

FIG. 4 illustrates the solution proposed in Paging Option 3. The evolved ProSe UE-to-Network Relay UE 402 monitors its own PO only and paging for the linked evolved ProSe Remote UE 400 is also sent in the evolved ProSe UE-to-Network Relay UE's 402 PO. The evolved ProSe Remote UE 400 does not need to attempt paging reception over downlink while linked to the evolved ProSe UE-to-Network Relay UE 402. The evolved ProSe UE-to-Network Relay UE 402 has to decode a paging message, determine which evolved ProSe Remote UE 400 the paging is for and needs to relay the evolved ProSe Remote UE's 400 paging over short range link. In order to page the evolved ProSe Remote UE 400, the core network (e.g., MME 406) is required to know linked status between the evolved ProSe UE-to-Network Relay UE 402 and the evolved ProSe Remote UE 400 and remap evolved ProSe Remote UE's 400 paging messages to occur on evolved ProSe UE-to-Network Relay UE's 402 POs when evolved ProSe Remote UE 400 are linked.

Paging Option 3 advantageously is also commonly applicable to both when the evolved ProSe Remote UE 400 is in and out of E-UTRAN coverage. The evolved ProSe Remote UE 400 does not need to attempt paging reception over DL while linked to the evolved ProSe UE-to-Network Relay UE 402. This is more power efficient for the evolved ProSe Remote UE 400. The evolved ProSe UE-to-Network Relay UE 402 does not need to monitor multiple POs. This is more power efficient for the evolved ProSe UE-to-Network Relay UE 402 compared to the option 2. However, the evolved ProSe UE-to-Network Relay UE 402 needs to relay evolved ProSe Remote UE's 400 paging over short range link. This causes additional power consumption for evolved ProSe UE-to-Network Relay UE 402 and additional use of SL resource. In addition, the network needs to know linked status between the evolved ProSe UE-to-Network Relay UE 402 and the evolved ProSe Remote UE 400 in order for Paging Option 3 to be implemented.

Figure 5:
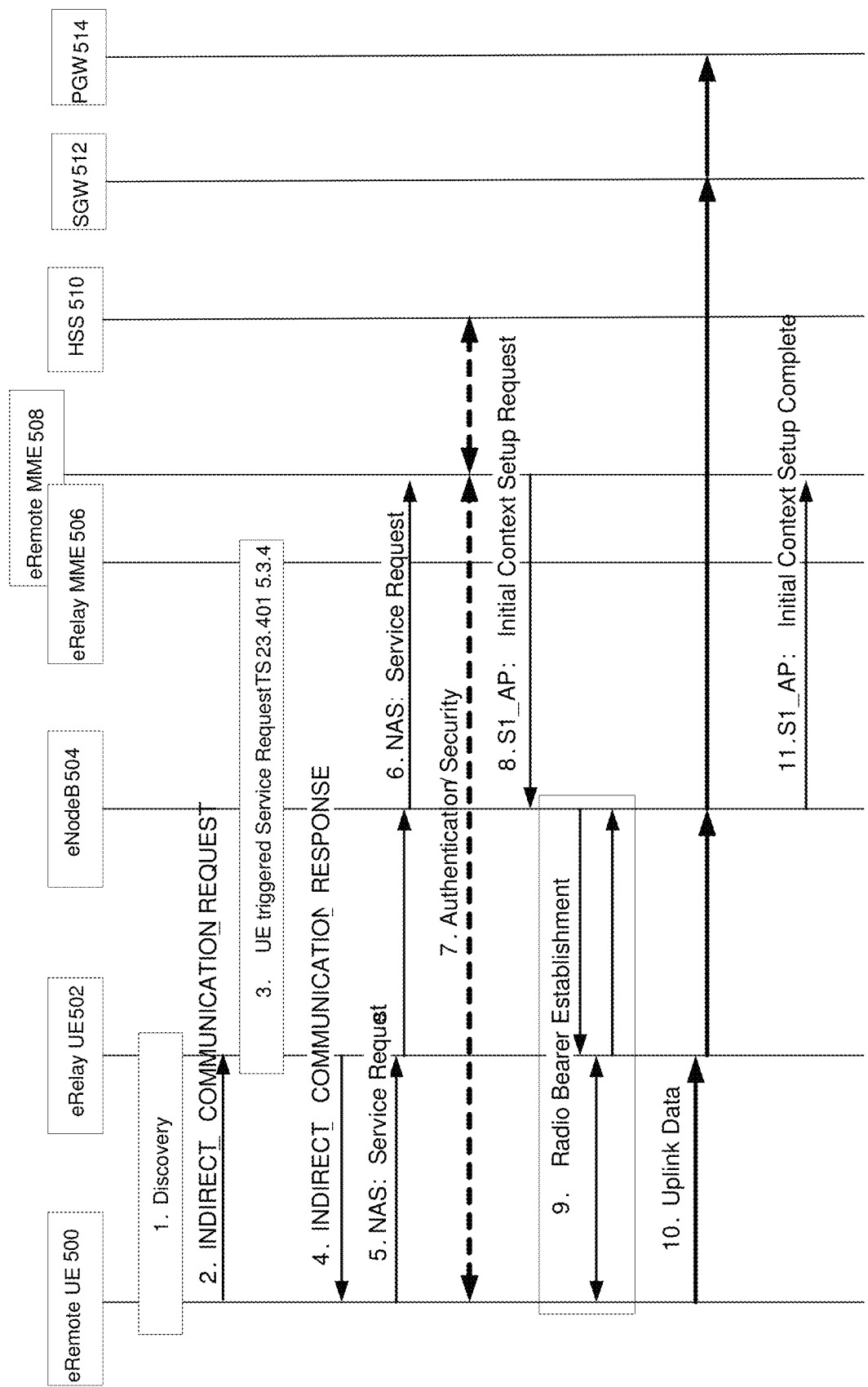
FIG. 5 is a signaling diagram illustrating an eRemote-UE triggered service request.

FIG. 5 illustrates a procedure for establishing a UE-NW relay service as described in 3GPP TR 23.733. The eRemote-UE 500 and eRelay-UE 502 perform PC5 discovery in step 1 of the procedure, according to selected solution for Key Issue 2. Triggered by upper layers, the eRemote-UE 500 initiate one-to-one communication with the eRelay-UE 502, by sending an INDIRECT_COMMUNICATION_REQUEST to the eRelay-UE 502 in step 2. Triggered by the request received from the eRemote-UE 500, the eRelay-UE 502 sends a Service Request message (eRelay-UE 502 identity e.g. GUTI, S-TMSI) to eRelay-UE's MME 506 in step 3 of the procedure. This step is according to clause 5.3.4 in TS 23.401. In Step 4, the eRelay-UE 502 sends the INDIRECT_COMMUNICATION_RESPONSE message to the eRemote-UE 500. If the INDIRECT_COMMUNICATION_REQUEST was accepted the eRemote-UE 500 sends a Service Request (5) (eRemote-UE 500 identity, e.g., GUTI, S-TMSI) to the eRemote-UE's MME 508. The Service Request message is encapsulated in a RRC message to the eNB 504. The eRelay-UE 502 forwards the message to the eNB 504 using RAN specified L2 relay method.

In Step 6 of the procedure of FIG. 5, the eNB 504 uses the eRemote-UE's 500 identity to derive the eRemote-UE MME 508 identity and forwards the NAS message in a S1-MME control message as shown in FIG. 5. This step is according to clause 5.3.4 in TS 23.401. Whether the eNB 504 attaches the eRelay-UE's 502 identifier or any other information to the S1-MME control message, depends on the final selection for eRemote-UE 500 Idle mode operation and charging solution. In Step 7, NAS authentication/security procedures as defined in clause 5.3.10 in TS 23.401 on "Security function" may be performed. FIG. 5 also illustrates the MME 508 sends an S1-AP Initial Context Setup Request message to the eNB 504 in step 8 of the procedure. The eNB 504 performs the radio bearer establishment procedure according to clause 5.3.4 in TS 23.401 in step 9 of the procedure. The eRelay-UE 502 forwards all the messages between the eRemote-UE 500 and eNB 504 using RAN specified L2 relay method. In Step 10, the uplink data (10) from the eRemote-UE 500 can now be forwarded by the eRelay-UE 502 and the eNB 504 to the Serving GW 512. FIG. 5 also illustrates that the Serving GW 512 forwards the uplink data to the PDN GW 512. The eNB 504 sends an S1-AP message Initial Context Setup Complete to the MME 508 in step 11 of the procedure. This step is described in detail in TS 36.300.

Figure 6:
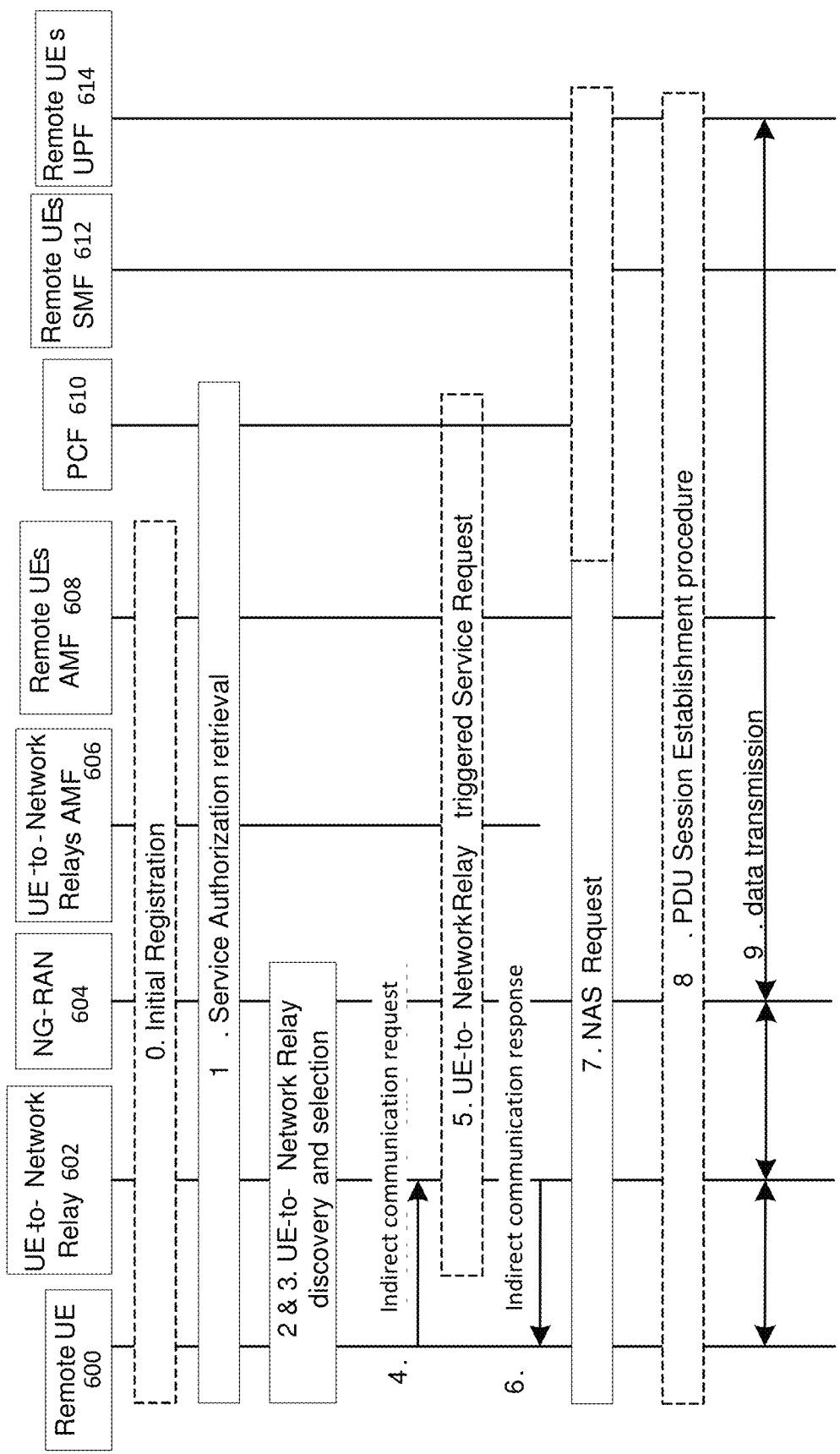
FIG. 6 is a signaling diagram illustrating a procedure for connection establishment for indirect communication via UE-to-Network Relay UE.

Studies on system enhancement in Proximity based Services (ProSe) in the 5G System are described 3GPP TR 23.752. Section 6.7 describes Indirect Communication via Layer 2 UE-to-Network Relay UE and the following functionalities: Control and User Plane Protocols, Network Selection, Authorization and provisioning, Registration and Connection Management, QoS, Mobility (e.g., Mobility Restrictions), and Security. FIG. 6 illustrates steps of a procedure for connection establishment for Indirect Communication via Layer 2 UE-to-Network Relay UE. As shown in FIG. 6, the Remote UE and UE-to-Network Relay UE may independently perform the initial registration, in step 0, to the network according to registration procedures in TS 23.502 if the Remote UE is in coverage. The allocated 5G Globally Unique Temporary ID (GUTI) of the Remote UE is maintained when later NAS signaling between Remote UE and Network is exchanged via the UE-to-Network Relay UE. It should be noted that the procedure illustrated in FIG. 6 assumes a single hop relay.

FIG. 6 also illustrates that, if in coverage, the Remote UE and UE-to-Network Relay UE independently get the service authorization for indirect communication from the network as shown in step 1. In steps 2 & 3 of the procedure, the Remote UE and UE-to-Network Relay UE perform UE-to-Network Relay UE discovery and selection. The Remote UE initiates a one-to-one communication connection with the selected UE-to-Network Relay UE over PC5, by sending an indirect communication request message to the UE-to-Network Relay in step 4 of the procedure. If the UE-to-Network Relay UE is in CM_IDLE state, triggered by the communication request received from the Remote UE, the UE-to-Network Relay UE sends a Service Request message over PC5 to its serving AMF in step 5. The Relay's AMF may perform authentication of the UE-to-Network Relay UE based on NAS message validation and if needed the AMF will check the subscription data. If the UE-to-Network Relay UE is already in CM_CONNECTED state and is authorised to perform Relay service then step 5 is omitted.

In Step 6 of the procedure of FIG. 6, the UE-to-Network Relay UE sends the indirect communication response message to the Remote UE. The Remote UE sends a NAS message to the serving AMF in step 7. The NAS message is encapsulated in an RRC message that is sent over PC5 to the UE-to-Network Relay UE, and the UE-to-Network Relay UE forwards the message to the NG-RAN. The NG-RAN derives Remote UE's serving AMF and forwards the NAS message to this AMF. It is assumed that the Remote UE's PLMN is accessible by the UE-to-Network Relay's PLMN and that UE-to-Network Relay UE AMF supports all S-NSSAIs the Remote UE may want to connect to. If Remote UE has not performed the initial registration to the network in step 0, the NAS message is initial registration message. Otherwise, the NAS message is service request message.

If the Remote UE performs initial registration via the UE-to-Network relay, the Remote UE's serving AMF may perform authentication of the Remote UE based on NAS message validation and if needed the Remote UE's AMF checks the subscription data. In Step 8 of FIG. 6, the Remote UE may trigger the PDU Session Establishment procedure as defined in clause 4.3.2.2 of TS 23.502. In Step 9, the data is transmitted between Remote UE and UPF via UE-to-Network Relay UE and NG-RAN. The UE-to-Network Relay UE forwards all the data messages between the Remote UE and NG-RAN using RAN specified L2 relay method.

As discussed above, in the event that Paging Option 3 is adopted, the prerequisite is that the Relay UE and Remote UE need to be linked or associated in the wireless communication network (e.g., 5GC). However, it is not clear how the Relay UE and Remote UE should be linked or associated in the current 3GPP specifications. To solve this issue, the present disclosure describes systems and methods for efficiently linking/delinking between a Remote UE and a Relay UE.

Figure 8:
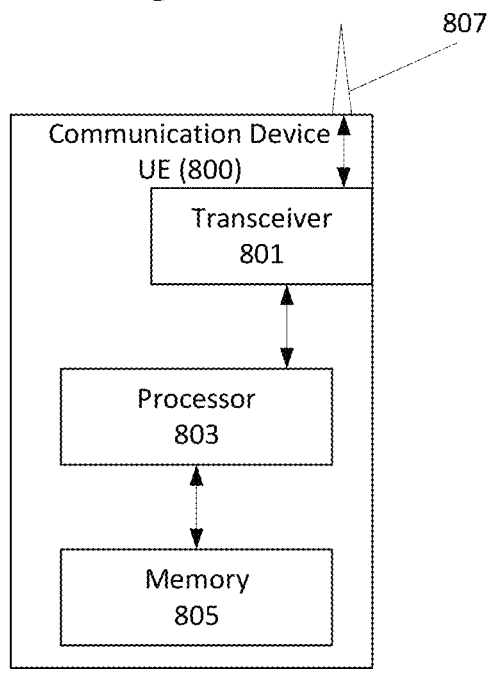
FIG. 8 is a block diagram illustrating a wireless device UE according to some embodiments of present disclosure.

FIG. 8 is a block diagram illustrating elements of a communication device UE 300 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of the present disclosure. (Communication device 800 may be provided, for example, as discussed below with respect to wireless device 4110 of FIG. 14.) As shown, communication device UE may include an antenna 807 (e.g., corresponding to antenna 4111 of FIG. 14), and transceiver circuitry 801 (also referred to as a transceiver, e.g., corresponding to interface 4114 of FIG. 14)

including a transmitter and a receiver configured to provide uplink and downlink radio communications with a base station(s) (e.g., corresponding to network node 4160 of FIG. 14, also referred to as a RAN node) of a radio access network. Communication device UE may also include processing circuitry 803 (also referred to as a processor, e.g., corresponding to processing circuitry 4120 of FIG. 14) coupled to the transceiver circuitry, and memory circuitry 805 (also referred to as memory, e.g., corresponding to device readable medium 4130 of FIG. 14) coupled to the processing circuitry. The memory circuitry 805 may include computer readable program code that when executed by the processing circuitry 803 causes the processing circuitry to perform operations according to embodiments disclosed herein. According to other embodiments, processing circuitry 803 may be defined to include memory so that separate memory circuitry is not required. Communication device UE may also include an interface (such as a user interface) coupled with processing circuitry 803, and/or communication device UE may be incorporated in a vehicle.

As discussed herein, operations of communication device UE may be performed by processing circuitry 803 and/or transceiver circuitry 801. For example, processing circuitry 803 may control transceiver circuitry 801 to transmit communications through transceiver circuitry 801 over a radio interface to a radio access network node (also referred to as a base station) and/or to receive communications through transceiver circuitry 801 from a RAN node over a radio interface. Moreover, modules may be stored in memory circuitry 805, and these modules may provide instructions so that when instructions of a module are executed by processing circuitry 803, processing circuitry 803 performs respective operations (e.g., operations discussed below with respect to Example Embodiments relating to wireless communication devices).

Figure 9:
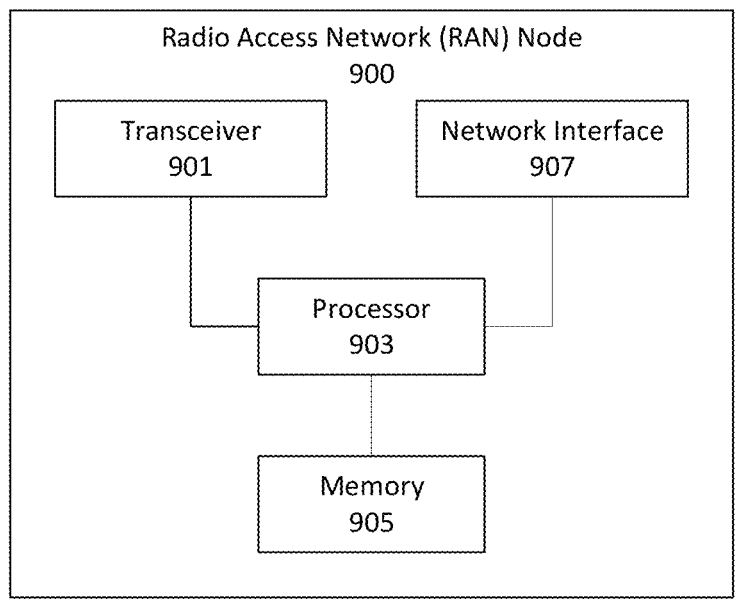
FIG. 9 is a block diagram illustrating a radio access network RAN node (e.g., a base station eNB/gNB) according to some embodiments of present disclosure.

FIG. 9 is a block diagram illustrating elements of a radio access network (RAN) node 900 (also referred to as a network node, base station, eNodeB/eNB, gNodeB/gNB, etc.) of a Radio Access Network (RAN) configured to provide cellular communication according to embodiments of present disclosure. (RAN node 900 may be provided, for example, as discussed below with respect to network node 4160 of FIG. 14.) As shown, the RAN node may include transceiver circuitry 901 (also referred to as a transceiver, e.g., corresponding to portions of interface 4190 of FIG. 14) including a transmitter and a receiver configured to provide uplink and downlink radio communications with mobile terminals. The RAN node may include network interface circuitry 907 (also referred to as a network interface, e.g., corresponding to portions of interface 4190 of FIG. 14) configured to provide communications with other nodes (e.g., with other base stations) of the RAN and/or core network CN. The network node may also include processing circuitry 903 (also referred to as a processor, e.g., corresponding to processing circuitry 4170) coupled to the transceiver circuitry, and memory circuitry 905 (also referred to as memory, e.g., corresponding to device readable medium 4180 of FIG. 14) coupled to the processing circuitry. The memory circuitry 905 may include computer readable program code that when executed by the processing circuitry 903 causes the processing circuitry to perform operations according to embodiments disclosed herein. According to other embodiments, processing circuitry 903 may be defined to include memory so that a separate memory circuitry is not required.

As discussed herein, operations of the RAN node may be performed by processing circuitry 903, network interface 907, and/or transceiver 901. For example, processing circuitry 903 may control transceiver 901 to transmit downlink communications through transceiver 901 over a radio interface to one or more mobile terminals UEs and/or to receive uplink communications through transceiver 901 from one or more mobile terminals UEs over a radio interface. Similarly, processing circuitry 903 may control network interface 907 to transmit communications through network interface 907 to one or more other network nodes and/or to receive communications through network interface from one or more other network nodes. Moreover, modules may be stored in memory 905, and these modules may provide instructions so that when instructions of a module are executed by processing circuitry 903, processing circuitry 903 performs respective operations (e.g., operations discussed below with respect to Example Embodiments relating to RAN nodes).

According to some other embodiments, a network node may be implemented as a core network CN node without a transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

Figure 10:
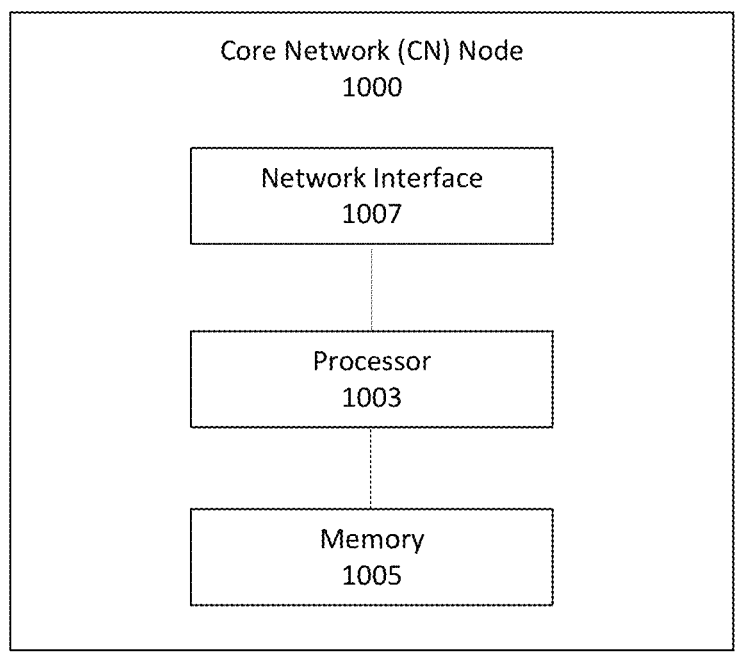
FIG. 10 is a block diagram illustrating a core network CN node (e.g., an AMF node, an SMF node, etc.) according to some embodiments of present disclosure.

FIG. 10 is a block diagram illustrating elements of a core network CN node (e.g., an SMF node, an AMF node, etc.) of a communication network configured to provide cellular communication according to embodiments of present disclosure. As shown, the CN node may include network interface circuitry 1007 (also referred to as a network interface) configured to provide communications with other nodes of the core network and/or the radio access network RAN. The CN node may also include a processing circuitry 1003 (also referred to as a processor) coupled to the network interface circuitry, and memory circuitry 1005 (also referred to as memory) coupled to the processing circuitry. The memory circuitry 1005 may include computer readable program code that when executed by the processing circuitry 1003 causes the processing circuitry to perform operations according to embodiments disclosed herein. According to other embodiments, processing circuitry 1003 may be defined to include memory so that a separate memory circuitry is not required.

As discussed herein, operations of the CN node may be performed by processing circuitry 1003 and/or network interface circuitry 1007. For example, processing circuitry 1003 may control network interface circuitry 1007 to transmit communications through network interface circuitry 1007 to one or more other network nodes and/or to receive communications through network interface circuitry from one or more other network nodes. Moreover, modules may be stored in memory 1005, and these modules may provide instructions so that when instructions of a module are executed by processing circuitry 1003, processing circuitry 1003 performs respective operations (e.g., operations discussed below with respect to Example Embodiments relating to core network nodes).

Figure 7:
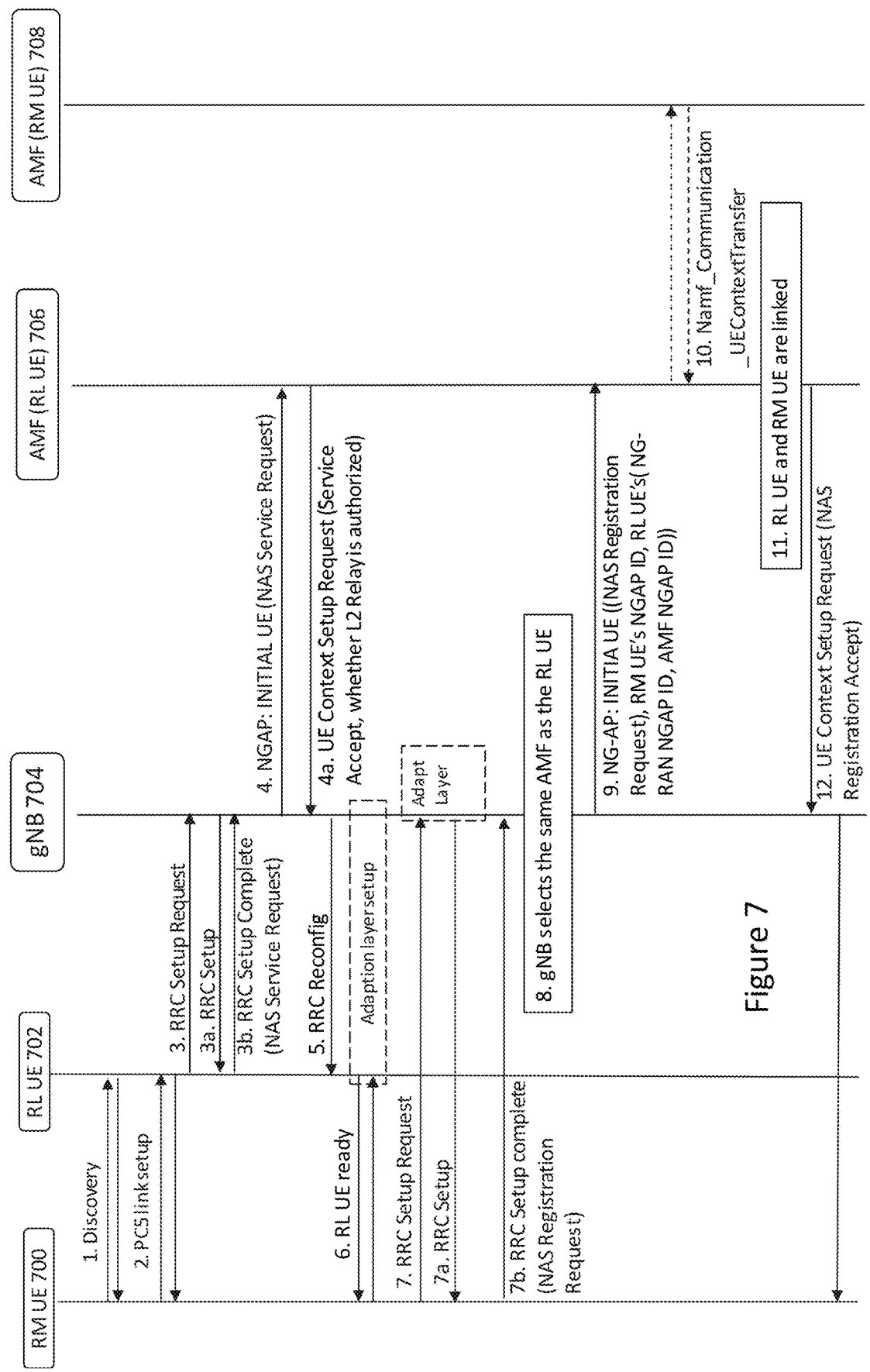
FIG. 7 is a signaling diagram illustrating linking of a Remote UE and Relay UE in accordance with some embodiments of the present disclosure.

FIG. 7 illustrates an example signaling diagram illustrating an example signaling procedure to link a Remote (RM) UE 700 to a Relay (RL) UE 702 in accordance with embodiments of the present disclosure. For example, FIG. 7 illustrates a gNB 704 selects to use the same AMF 706 for RM UE 700 and RL UE 702 in step 8 of the signaling procedure. For instance, in FIG. 7 AMF 706 for RL UE 702 is also used for the RM UE 700 when the RM UE 700 is linked to the RL UE 702. It could also be that AMF 708 for RM UE 700 is also used for the RL UE 702 when the RM UE 700 is linked to the RL UE 702. Suppose AMF 706 for RL UE 702 will also be used for the RM UE 700, the gNB 704 sends, in step 9, the NGAP INITIAL UE Message for the RM UE 700 to the AMF 706 currently used for the RL UE 702 and includes in the NGAP INITIAL UE Message the RL UE's 702 info (i.e. NG-RAN NGAP ID and AMF NGAP ID).

If the RM UE 700 contains 5G GUTI in Registration Request and 5G GUTI points to a different AMF 708 (that served the UE before), then Namf Communication_UEContextTransfer is sent to the old AMF 708 to retrieve the context of the UE (currently as Remote UE 700) as shown in step 10 in FIG. 7. In step 11, the RL UE 702 and the RM UE 700 are now linked in the AMF 706 currently used for the RL UE 702. From now on this AMF will be used for both the RL UE 702 and the RM UE 700. The AMF 706 can adjust the paging parameters of the RM UE 700 to be aligned with the RL UE's 702 paging parameters so that Paging Option 3 could be applied.

Delinking of a Remote UE 700 from a Relay UE 702 may be required if the Remote UE 700 moves away from the Relay UE 702 and becomes directly connected to the wireless communication network over the Uu interface. If the Remote UE 700 moves and becomes directly connected over Uu, it becomes a normal UE. In this case, the gNB 704 (or another gNB) sends NGAP INITIAL UE Message for the said UE (e.g. for NAS Registration Request), similar to step 9 in FIG. 7 with the difference that the gNB 704 does not include info of the RL UE 702 that was previously linked to the said Remote UE 700. When receiving such NGAP message the AMF 706 understands that the said UE is now directly connected over Uu and a delinking of the said UE 700 from the previously linked RL UE 702 should be performed.

When the said UE 700 becomes directly connected over Uu, the new AMF currently serving the said UE 700 (previously a remote UE) may or may not be changed. In the case the AMF is not changed, the AMF 706 will remove the old linking of the said UE with the RL UE 702 that was previously linked to the said UE 700. If the AMF changes, the new AMF will first retrieve the said UE 700 context, e.g., without information on the old linking, from the old AMF 706. The old AMF 706 will remove the said UE 700 context.

Delinking may also be required if the Remote UE 700 connects to another Relay UE. In this situation, the gNB NGAP INITIAL Message for the Remote UE 700 will include the info of a different RL UE. Alternatively, or in addition to, the gNB NGAP INITIAL Message explicitly indicates that the Remote UE 700 has left the previous RL UE 702. The old AMF 706 that previously served the said UE 700 will remove the linking of the said UE 700 with the old RL UE 702 that was previously linked to the said UE 700, following similar procedure as described above. The new AMF that is currently serving the said UE 700 will add the linking of the said UE 700 with the new RL UE to which the said UE 700 is currently connected, also following similar procedure as described above. The operations of the Remote UE 700 and Relay UE 702 described above may be implemented using the structure of FIG. 8 described above. For examples, modules may be stored in memory 805 of FIG. 8, and these modules may provide instructions so that when the instructions of a module are executed by respective UE communication device processing circuitry 803, processing circuitry 803 performs respective operations as described above.

Figure 11:
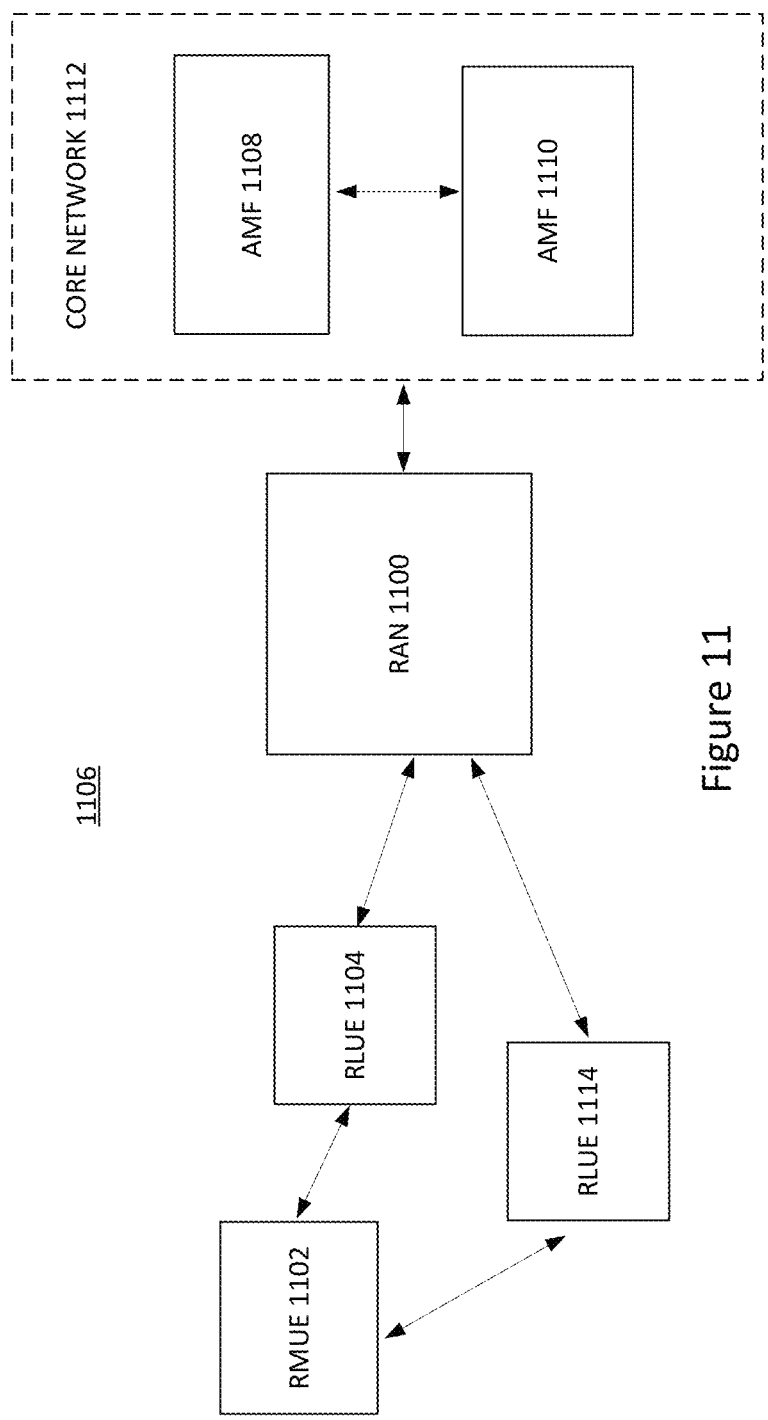
FIG. 11 is a block diagram of a communication network in accordance with embodiments of the present disclosure.

Operations of a RAN node 900 (implemented using the structure of FIG. 9) will now be discussed with reference to the flow chart of FIG. 12 and example RAN node 1100 illustrated in FIG. 11 according to some embodiments of the present disclosure. For example, modules may be stored in memory 905 of FIG. 9, and these modules may provide instructions so that when the instructions of a module are executed by respective RAN node processing circuitry 903, processing circuitry 903 performs respective operations of the flow chart.

Figure 12:
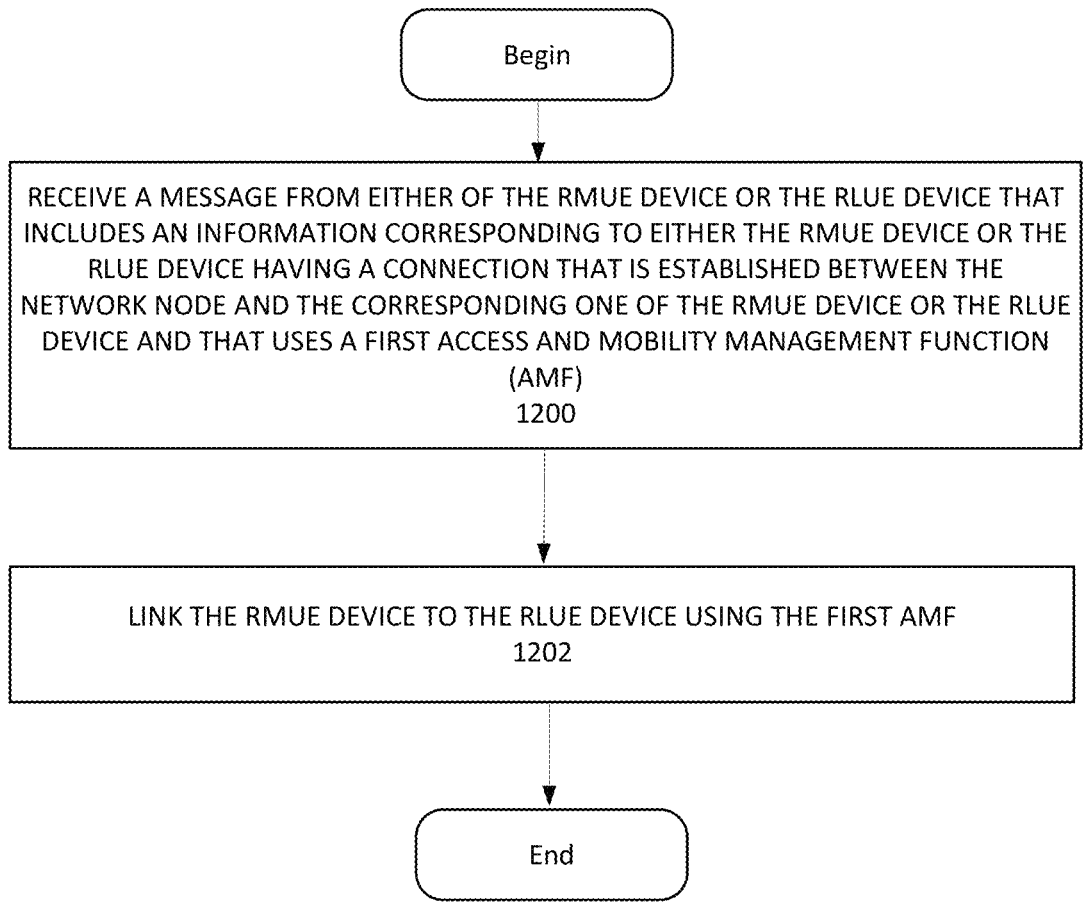
FIG. 12 is a flow chart illustrating operations of a radio network node that links a remote user equipment (RMUE) device to a relay user equipment (RLUE) device in a communication network according to some embodiments of present disclosure.
Figure 13:
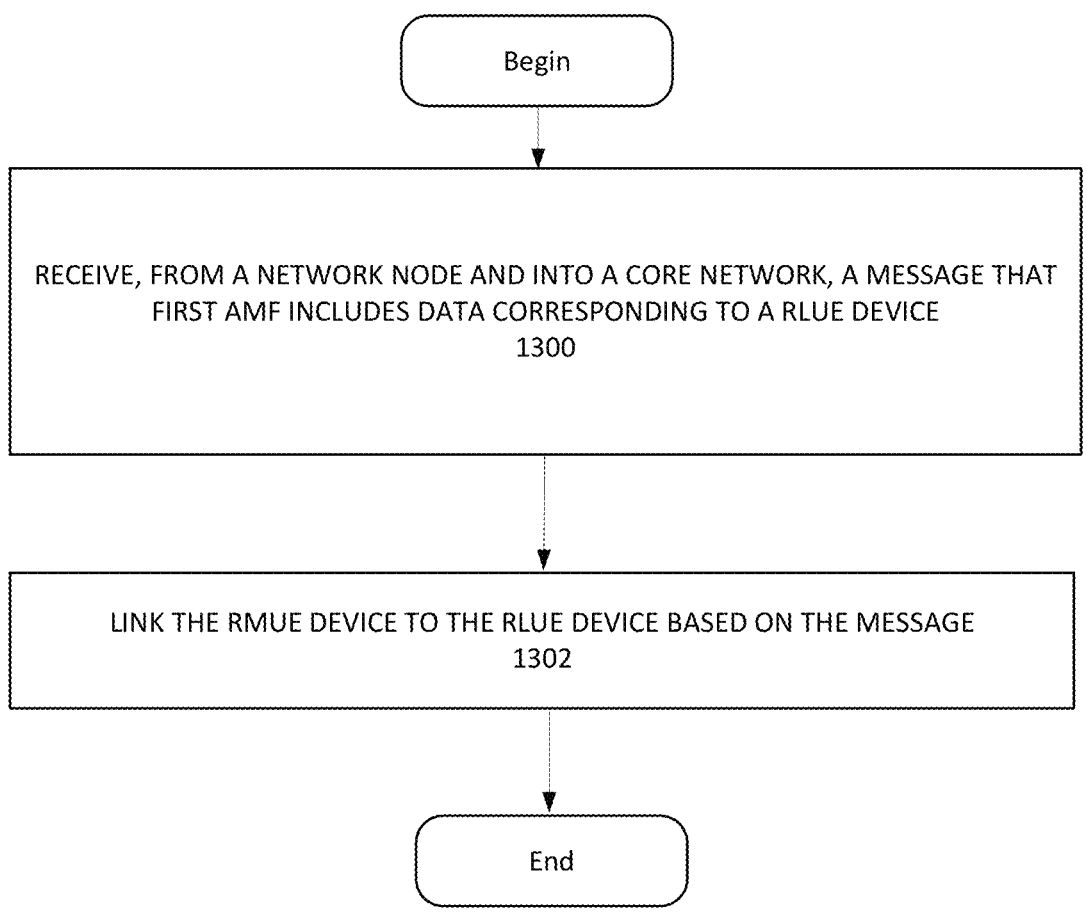
FIG. 13 is a flow chart illustrating operations of a core network node that links the RMUE device to the RLUE device according to some embodiments of present disclosure.

FIG. 12 illustrates a method of operating a radio access network node to link a remote user equipment (RMUE) device to a relay user equipment (RLUE) device in a communications network according to embodiments. For example, FIG. 11 illustrates an example RAN node 1100 that operates to link RMUE device 1102 to a RLUE 1104 in a communications network 1106. In some embodiments, RAN node 1100 comprises a gNB, such as gNB 704 discussed above. However, it should be noted that RAN node 1100 may comprise a different type of radio access network node, such as different types described herein, and is not limited to a gNB type of radio access network node.

Returning to FIG. 12, the method includes receiving 1200 a message from either of the RMUE device or the RLUE device that includes information corresponding to either the RMUE device or the RLUE device having a connection that is established between the radio access network node and the corresponding one of the RMUE device or the RLUE device and that uses a first access and mobility management function, AMF. Continuing the previous example, FIG. 11 illustrates RAN node 1100 receives a message from either the RMUE device 1102 or the RLUE device 1104 that includes the information corresponding to either the RMUE 1102 device or the RLUE device 1104 having the connection that is established between the RAN 110 and the corresponding one of the RMUE device 1102 or the RLUE device 1104 and that uses a first AMF 1108 operating in a core network 1112.

FIG. 12 also illustrates the method includes linking 1202 the RMUE device to the RLUE device using the first AMF. For example, RAN 1100 links RMUE device 1102 to RLUE device 1104 using AMF 1108 according to embodiments. In some embodiments, the method includes sending to a core network, a message that the first AMF includes data corresponding to the RLUE device or the RMUE device. For example, RAN 1100 operates to send to core network 1112 a message that AMF 1108 includes data corresponding to RLUE 1104 or the RMUE 1102. According to some embodiments, the method includes sending, to a core network, a registration message that includes information corresponding to the RLUE device. For example, RAN 1100 operates to send, to core network 1112, a registration message that includes information corresponding to the RLUE 1104. In this embodiment, the information corresponding to the RLUE device may comprise a next generation application protocol identifier (NGAP ID) that corresponds to the RLUE and an AMF identifier that corresponds to the RLUE. For example, the information corresponding to RLUE device 1104 may comprise NGAP ID that corresponds to RLUE 1104 and an AMF identifier of AMF 1108 that corresponds to the RLUE 1104.

In an embodiment, the RMUE device is registered with the core network based on the first AMF and the RLUE device is linked to the RMUE device using the first AMF based on the first AMF being used by the RMUE device. For example, RMUE device 1102 is registered with core network 1112 based on AMF 1110. In this example, RLUE device 1104 is linked to the RMUE device 1102 using AMF 1110 based on AMF 1110 being used by the RMUE device 1102. In another embodiment, the RLUE device is registered with the core network based on the first AMF and the RMUE device is linked to the RLUE device using the first AMF based on the first AMF being used by the RLUE device. For example, RLUE device 1104 is registered with the core network 1112 based on AMF 1108. In this example, the RMUE device 1102 is linked to the RLUE device 1104 using AMF 1108 based on AMF 1108 being used by the RLUE device 1106.

According to some embodiments, the method also includes linking the RMUE device to the RLUE device using the first AMF by modifying paging parameters of the RMUE device to be aligned with paging parameters of the RLUE device. For example, RAN 1100 operates to modify paging parameters of RMUE device 1102 to be aligned with paging parameters of RLUE device 1104. In another example, RAN 1100 operates to modify paging parameters of RMUE device 1102 similarly as described above with regards to FIG. 7 above.

The method also includes unlinking the RMUE device and the RLUE device based on the RMUE device moving and becoming directly linked to the radio access network node according to some embodiments. For example, RAN 1100 of FIG. 11 operates to unlink RMUE device 1102 and the RLUE device 1104 based on the RMUE device 1102 moving and becoming directly linked to RAN 1100 (not shown). In some embodiments, the method also includes sending a message to the first AMF that does not include information corresponding to the RLUE device. In some further embodiments, the first AMF removes the link between the RMUE device and the RLUE device, wherein the first AMF corresponds to the RMUE device. Continuing the previous example, RAN 1100 sends a message to AMF 1108 that does not include information corresponding to RLUE device 1104. In this example, AMF 1108 corresponds to RMUE device 1102 and AMF 1108 removes the link between the RMUE 1102 and RLUE 1104.

In some other embodiments, a second AMF that is different from the first AMF corresponds to the RMUE device and the second AMF retrieves the linking of the RLUE device. Further in this embodiment, the first AMF removes the linking between the RMUE device and the RLUE device. For example, AMF 1110 of FIG. 11 is different from AMF 1108 and AMF 1110 corresponds to RMUE device 1102. In this example, AMF 1110 retrieves the linking of RLUE device 1104. Further in this example, AMF 1108 removes the linking between RMUE device 1102 and RLUE device 1104.

In some embodiments, the RLUE device comprises a first RLUE device. In this embodiment, the RMUE device moves from the first RLUE device to a second RLUE device. For example, RLUE 1104 of FIG. 11 comprises a first RLUE device 1104 and RMUE device 1102 moves from RLUE 1104 to second RLUE device 1114. In some embodiments, the method also includes receiving, from either the RMUE device or the second RLUE device, information corresponding to the first RLUE device and to the second RLUE device. The method also includes linking the RMUE device to the second RLUE device using a second AMF according to this embodiment. Continuing the previous example, RAN 1100 illustrated in FIG. 11 receives, from either the RMUE device 1102 or the second RLUE device 1114, information corresponding to the first RLUE device 1104 and to the second RLUE device 1114. In this example, RAN 110 link RMUE device 1104 to RLUE 1114 using AMF 1110. RLUE 1114 is associated with AMF 1110 in this example.

According to some embodiments, the method also includes unlinking the RMUE device and the first RLUE device based on the RMUE device moving to a second RLUE device that is different from the first RLUE device. For example, RAN 1100 illustrated in FIG. 11 unlinks RMUE device 1102 and RLUE device 1104 based on RMUE device 1102 moving to RLUE device 1114 that is different from RLUE device 1104. In some embodiments, the method also includes sending, to the core network, a registration message that includes information corresponding to the second RLUE device. For example, RAN 1100 sends, to core network 1112, a registration message that includes information corresponding to the second RLUE device 1114. The information corresponding to the second RLUE device comprises a NGAP ID that corresponds to the second RLUE device and a second AMF identifier that corresponds to the second RLUE device according to some embodiments. Continuing the previous example, information corresponding to second RLUE device 1114 would comprise an NGAP ID that corresponds to the second RLUE device 1114 and an identifier of AMF 1110 that corresponds to the second RLUE device 1114.

Operations of a Core Network CN node 1000 (implemented using the structure of FIG. 10) will now be discussed with reference to the flow chart of FIG. 14 and example AMF nodes 1108 and 1110 illustrated in FIG. 11 according to some embodiments of present disclosure. For example, modules may be stored in memory 1005 of FIG. 10, and these modules may provide instructions so that when the instructions of a module are executed by respective CN node processing circuitry 1003, processing circuitry 1003 performs respective operations of the flow chart.

Figure 14:
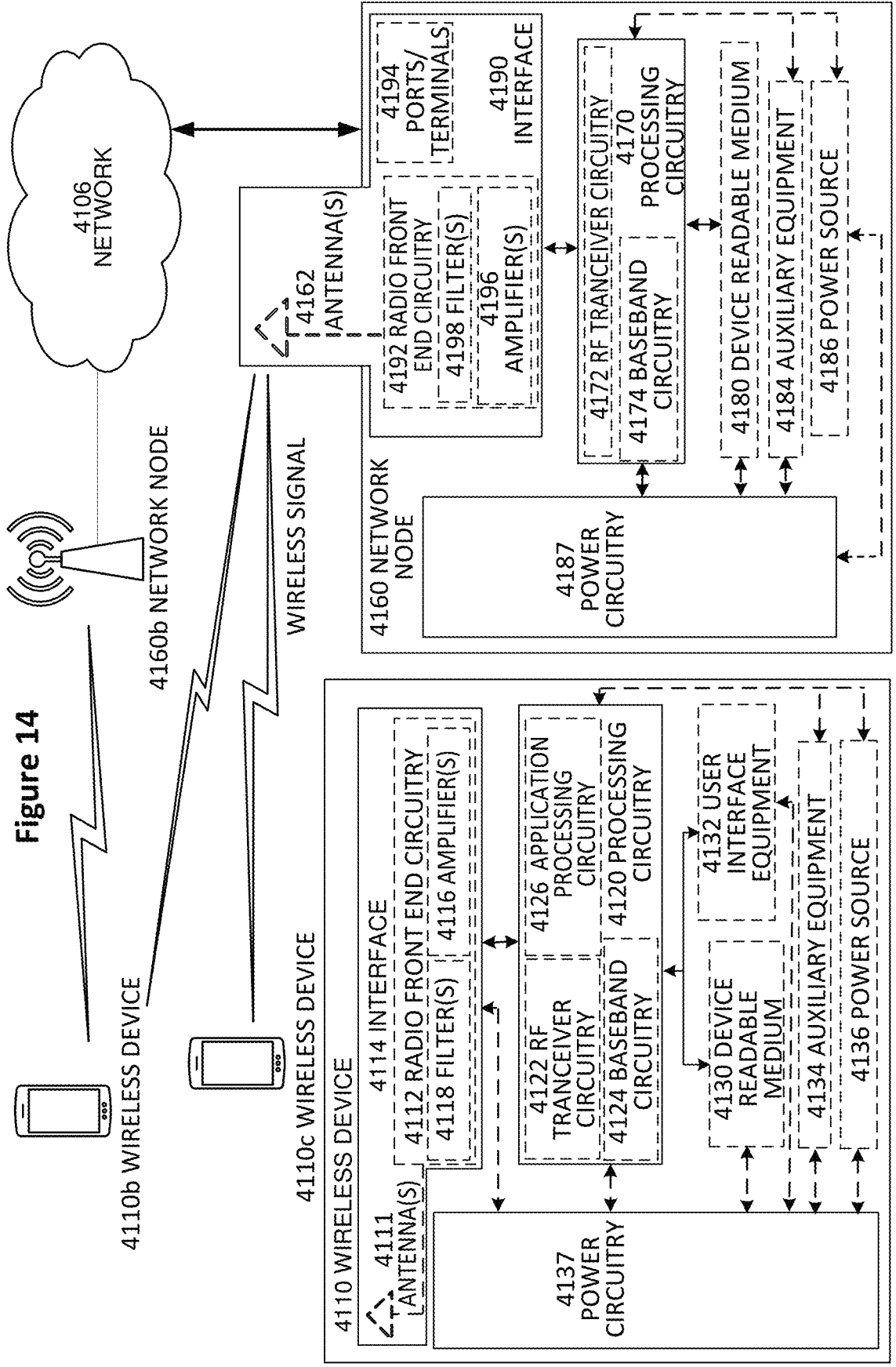
FIG. 14 is a block diagram of a wireless network in accordance with some embodiments.

FIG. 14 illustrates a method of operating a core network node operating a core network node to link a remote user equipment, RMUE, device to a relay user equipment, RLUE, device in a communications network according to embodiments of the present disclosure. FIG. 14 illustrates the method includes receiving 1300, from a radio access network node and into a core network, a message that a first AMF includes data corresponding to a RLUE device. For example, AMF 1108 illustrated in FIG. 11 receives, from RAN node 1100 into core network 1112, a message that AMF 1108 includes data corresponding to RLUE device 1104. Returning to FIG. 14, the method includes linking 1302 the RMUE device to the RLUE device based on the message. Continuing the previous example, AMF 1108 links RMUE device 1102 to RLUE device based on the message that AMF 1108 includes data corresponding to RLUE device 1104.

According to some embodiments, the method includes receiving, into the core network, a registration message that includes information corresponding to the RLUE device. In some embodiments, the information corresponding to the RLUE device comprises a next generation application protocol identifier, NGAP ID, that corresponds to the RLUE and an AMF identifier that corresponds to the RLUE. For example, AMF 1108 of FIG. 11 receives a registration message that includes information corresponding to RLUE device 1104. The registration message comprises a NGAP ID that corresponds to RLUE 1104 and an AMF identifier that corresponds to RLUE 1104.

In some embodiments, the RMUE device is registered with the core network based on the first AMF and the RLUE is linked to the RMUE using the first AMF based on the first AMF being used by the RMUE. For example, RMUE device 1102 illustrated in FIG. 11 is registered with core network 1112 based on AMF 1108 and the RLUE 1104 is linked to RMUE 1102 using the AMF 1108 based on the AMF 1108 being used by RMUE 1102. In some other embodiments, the RLUE device is registered with the core network based on the first AMF and the RMUE is linked to the RLUE using the first AMF based on the first AMF being used by the RLUE. For example, RMUE device 1102 illustrated in FIG. 11 is registered with core network 1112 based on AMF 1108 and the RLUE 1104 is linked to RMUE 1102 using the AMF 1108 based on the AMF 1108 being used by RLUE 1104.

According to some embodiments, the method also includes linking the RMUE device to the RLUE device using the first AMF by modifying paging parameters of the RMUE device to be aligned with paging parameters of the RLUE device. For example, AMF 1108 of FIG. 11 modifies paging parameters of RMUE device 1102 to be aligned with paging parameters of the RLUE device 1104. The method also includes unlinking the RMUE device and the RLUE device based on the RMUE device moving and becoming directly linked to the core network node. For example, AMF 1108 of FIG. 11 unlinks RMUE device 1102 and RLUE device 1104 based on the RMUE device 1102 moving and becoming directly linked to AMF 1108. In this embodiment, the method may also include receiving a message associated with the RMUE device that does not include information corresponding to the RLUE device. Continuing the previous example, AMF 1108 receives a message associated with RMUE device 1102 that does not include information corresponding to the RLUE device 1104. In one embodiment, the first AMF corresponds to the RMUE device and first AMF removes the link between the RMUE and the RLUE. For example, AMF 1108 illustrated in FIG. 11 corresponds to RMUE device 1102 and AMF 1108 removes the link between RMUE 1102 and RLUE 1104.

In some other embodiments, a second AMF that is different from the first AMF corresponds to the RMUE device and the second AMF retrieves the linking of the RLUE device. In this embodiment, the first AMF removes the linking between the RMUE device and the RLUE device. For example, AMF 1110 illustrated in FIG. 11 is different from AMF 1108 corresponding to RMUE device 1102. In this example AMF 1110 retrieves the linking of RLUE device 1104. AMF 1108 removes the linking between the RMUE 1102 and the RLUE 1104.

According to some embodiments, the RLUE device comprises a first RLUE device the RMUE device moves from the first RLUE device to a second RLUE device. For example, RLUE 1104 of FIG. 11 comprises a first RLUE device 1104 and RMUE device 1102 moves from RLUE 1104 to second RLUE device 1114. In some embodiments, the method also includes receiving information corresponding to the first RLUE device and to the second RLUE device. For example, AMF 1108 receives information corresponding to the RLUE device 1104 and RLUE device 1114. In this embodiment, the method also includes linking the RMUE device to the second RLUE device. In this example, AMF 1108 links RMUE device 1102 to RLUE device 1114.

In some embodiments, the method also includes unlinking the RMUE device and the first RLUE device based on the RMUE device moving to a second RLUE device that is different from the first RLUE device. For example, AMF 1108 unlinks RMUE device 1102 and RLUE device 1104 based on RMUE 1102 moving to RLUE 1114 that is different from RLUE 1104. The method also includes receiving, in the core network, a registration message that includes information corresponding to the second RLUE device according to some embodiments. In this embodiment, the information corresponding to the second RLUE device comprises a NGAP ID that corresponds to the second RLUE device and a second AMF identifier that corresponds to the second RLUE device. Continuing the previous example, AMF 1108 receives a registration message that includes information corresponding to the RLUE device 1114. The information corresponding to RLUE device 1114 comprises an NGAP ID that corresponds to the RLUE device 1114 and a second AMF identifier that corresponds to the RLUE device 1114. In this example, the second AMF identifier identifies AMF 1110 as corresponding to RLUE device 1114.

Example embodiments are discussed below.

Embodiment 1. A method of operating a radio access network node to link a remote user equipment, RMUE, device to a relay user equipment, RLUE, device in a communications network, the method comprising:

receiving a message from either of the RMUE device or the RLUE device that includes an information corresponding to either the RMUE device or the RLUE device having a connection that is established between the radio access network node and the corresponding one of the RMUE device or the RLUE device and that uses a first access and mobility management function, AMF; and linking the RMUE device to the RLUE device using the first AMF.

Embodiment 2. The method of embodiment 1, further comprising sending to a core network, a message that the first AMF includes data corresponding to the RLUE device or the RMUE device.

Embodiment 3. The method of embodiment 1, further comprising sending, to the core network, a registration message that includes information corresponding to the RLUE device.

Embodiment 4. The method of embodiment 3, wherein the information corresponding to the RLUE device comprises a next generation application protocol identifier, NGAP ID, that corresponds to the RLUE device and an AMF identifier that corresponds to the RLUE device.

Embodiment 5. The method of embodiment 1, wherein the RMUE device is registered with the core network based on the first AMF, and wherein the RLUE device is linked to the RMUE device using the first AMF based on the first AMF being used by the RMUE device.

Embodiment 6. The method of embodiment 1, wherein the RLUE device is registered with the core network based on the first AMF, and wherein the RMUE device is linked to the RLUE device using the first AMF based on the first AMF being used by the RLUE device.

Embodiment 7. The method of embodiment 1, wherein linking the RMUE device to the RLUE device using the first AMF comprises modifying paging parameters of the RMUE device to be aligned with paging parameters of the RLUE device.

Embodiment 8. The method of embodiment 1, further comprising unlinking the RMUE device and the RLUE device based on the RMUE device moving and becoming directly linked to the radio access network node.

Embodiment 9. The method of embodiment 8, further comprising sending a message to the first AMF that does not include information corresponding to the RLUE device.

Embodiment 10. The method of any of embodiment 8 and 9, wherein the first AMF corresponds to the RMUE device, and wherein the first AMF removes the link between the RMUE device and the RLUE device.

Embodiment 11. The method of embodiment 8, wherein a second AMF that is different from the first AMF corresponds to the RMUE device, wherein the second AMF retrieves the linking of the RLUE device, and
　　wherein the first AMF removes the linking between the RMUE device and the RLUE device.

Embodiment 12. The method of embodiment 1, wherein the RLUE device comprises a first RLUE device, wherein the RMUE device moves from the first RLUE device to a second RLUE device, and the method further comprising:
　　receiving, from either the RMUE device or the second RLUE device, information corresponding to the first RLUE device and to the second RLUE device; and
　　linking the RMUE device to the second RLUE device using an second AMF.

Embodiment 13. The embodiment of claim 1, wherein the RLUE device comprises a first RLUE device, the method further comprising unlinking the RMUE device and the first RLUE device based on the RMUE device moving to a second RLUE device that is different from the first RLUE device.

Embodiment 14. The embodiment of claim 13, further comprising sending, to the core network, a registration message that includes information corresponding to the second RLUE device.

Embodiment 15. The embodiment of claim 14, wherein the information corresponding to the second RLUE device comprises a next generation application protocol identifier, NGAP ID, that corresponds to the second RLUE device and a second AMF identifier that corresponds to the second RLUE device.

Embodiment 16. A radio access network, RAN, node comprising:
　　processing circuitry; and
　　memory coupled with the processing circuitry, wherein the memory includes instructions that when executed by the processing circuitry causes the RAN node to perform operations according to any of embodiments 1-15.

Embodiment 17. A computer program comprising program code to be executed by processing circuitry of a radio access network, RAN, node, whereby execution of the program code causes the RAN node to perform any of operations according to any of embodiments 1-15.

Embodiment 18. A method of operating a network node to link a remote user equipment, RMUE, device to a relay user equipment, RLUE, device in a communications network, the method comprising:
　　receiving, from a radio access network node and into a core network, a message that first AMF includes data corresponding to a RLUE device; and
　　linking the RMUE device to the RLUE device based on the message.

Embodiment 19. The method of embodiment 18, further comprising receiving, into the core network, a registration message that includes information corresponding to the RLUE device.

Embodiment 20. The method of embodiment 19, wherein the information corresponding to the RLUE device comprises a next generation application protocol identifier that corresponds to the RLUE device and an AMF identifier that corresponds to the RLUE device.

Embodiment 22. The method of embodiment 18, wherein the RMUE device is registered with the core network based on the first AMF, and wherein the RLUE is linked to the RMUE device using the first AMF based on the first AMF being used by the RMUE device.

Embodiment 23. The method of embodiment 18, wherein the RLUE device is registered with the core network based on the first AMF, and wherein the RMUE device is linked to the RLUE device using the first AMF based on the first AMF being used by the RLUE device.

Embodiment 24. The method of embodiment 18, wherein linking the RMUE device to the RLUE device using the first AMF comprises modifying paging parameters of the RMUE device to be aligned with paging parameters of the RLUE device.

Embodiment 25. The method of embodiment 18, further comprising unlinking the RMUE device and the RLUE device based on the RMUE device moving and becoming directly linked to the radio access network node.

Embodiment 26. The method of embodiment 25, further comprising receiving a message associated with the RMUE device that does not include information corresponding to the RLUE device.

Embodiment 27. The method of any of embodiment 25 and 26, wherein the first AMF corresponds to the RMUE device, and wherein the first AMF removes the link between the RMUE device and the RLUE device.

Embodiment 28. The method of embodiment 25, wherein a second AMF that is different from the first AMF corresponds to the RMUE device, wherein the second AMF retrieves the linking of the RLUE device, and
　　wherein the first AMF removes the linking between the RMUE device and the RLUE device.

Embodiment 29. The method of embodiment 18, wherein the RLUE device comprises a first RLUE device,
　　wherein the RMUE device moves from the first RLUE device to a second RLUE device, and the method further comprising:
　　receiving information corresponding to the first RLUE device and to the second RLUE device; and
　　linking the RMUE device to the second RLUE device.

Embodiment 30. The method of embodiment 18, wherein the RLUE device comprises a first RLUE device, the method further comprising unlinking the RMUE device and the first RLUE device based on the RMUE device moving to a second RLUE device that is different from the first RLUE device.

Embodiment 31. The method of embodiment 30, further comprising receiving, in the core network, a registration message that includes information corresponding to the second RLUE device.

Embodiment 32. The method of embodiment 31, wherein the information corresponding to the second RLUE device comprises a next generation application protocol identifier, NGAP ID, that corresponds to the second RLUE and a second AMF identifier that corresponds to the second RLUE.

Embodiment 33. A core network, CN, node comprising:
　　processing circuitry; and
　　memory coupled with the processing circuitry, wherein the memory includes instructions that when executed by the processing circuitry causes the CN node to perform operations of according to any of embodiments 18-32.

References are identified below.
3GPP TS 38.300
3GPP TS 38.331
3GPP TS 23.502
3GPP TS 36.746
3GPP TS 23.733
3GPP TS 23.752
Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

FIG. 14 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 14. For simplicity, the wireless network of FIG. 14 only depicts network 4106, network nodes 4160 and 4160b, and WDs 4110, 4110b, and 4110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 14, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 14 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 14 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 15:
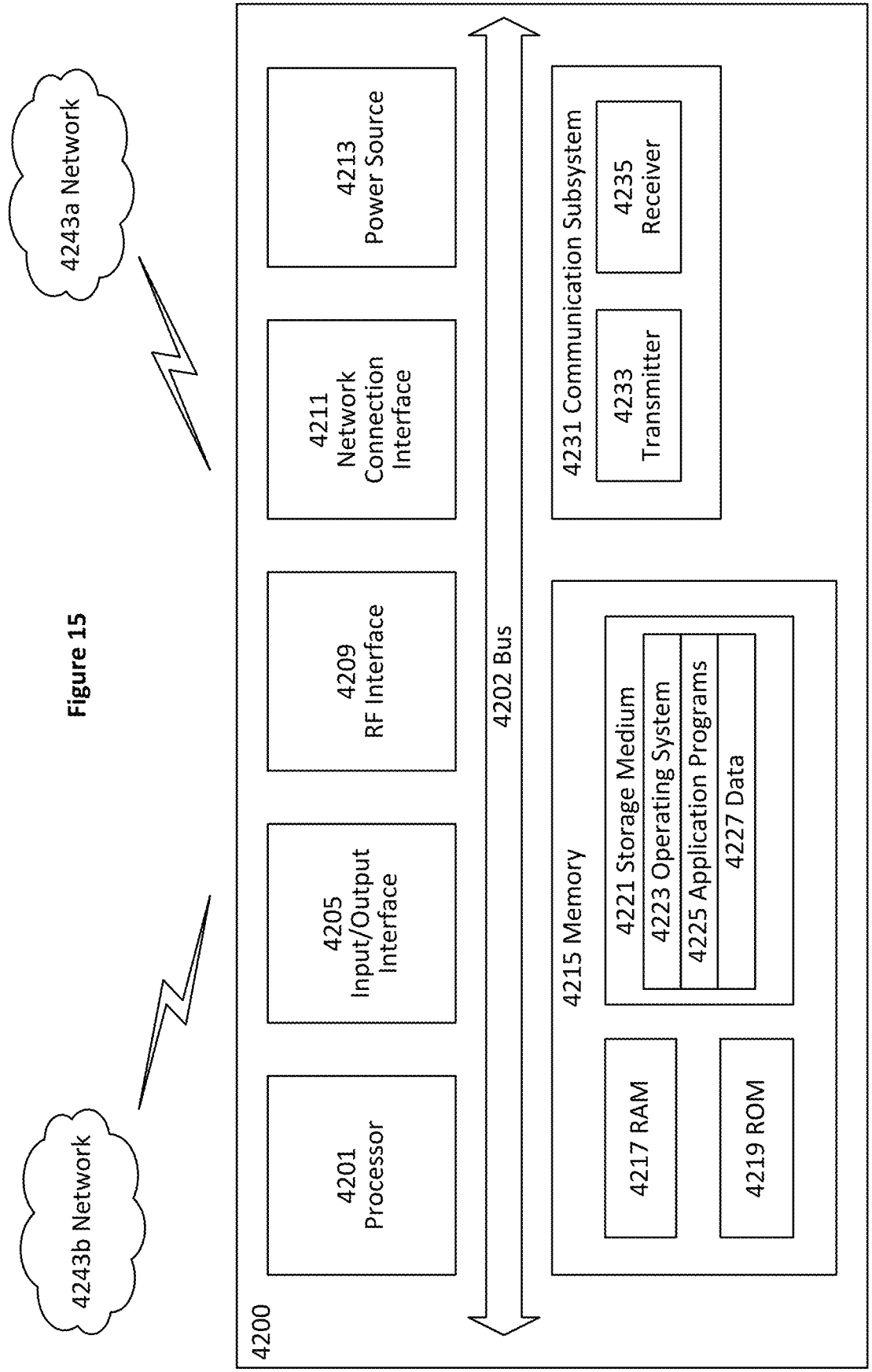
FIG. 15 is a block diagram of a user equipment in accordance with some embodiments

FIG. 15 illustrates a user Equipment in accordance with some embodiments.

FIG. 15 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 15, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 15 is a UE, the components discussed herein are equally applicable to a WD, and vice-versa.

In FIG. 15, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 15, or only a subset of the components. The level of integration between the components may vary from one UE to another UE. Further, certain UEs may contain multiple instances of a component, such as multiple processors, memories, transceivers, transmitters, receivers, etc.

In FIG. 15, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 15, RF interface 4209 may be configured to provide a communication interface to RF components such as a transmitter, a receiver, and an antenna. Network connection interface 4211 may be configured to provide a communication interface to network 4243a. Network 4243a may encompass wired and/or wireless networks such as a local-area network (LAN), a wide-area network (WAN), a computer network, a wireless network, a telecommunications network, another like network or any combination thereof. For example, network 4243*a* may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 15, processing circuitry 4201 may be configured to communicate with network 4243*b* using communication subsystem 4231. Network 4243*a* and network 4243*b* may be the same network or networks or different network or networks. Communication subsystem 4231 may be configured to include one or more transceivers used to communicate with network 4243*b*. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243*b* may encompass wired and/or wireless networks such as a local-area network (LAN), a wide-area network (WAN), a computer network, a wireless network, a telecommunications network, another like network or any combination thereof. For example, network 4243*b* may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 16:
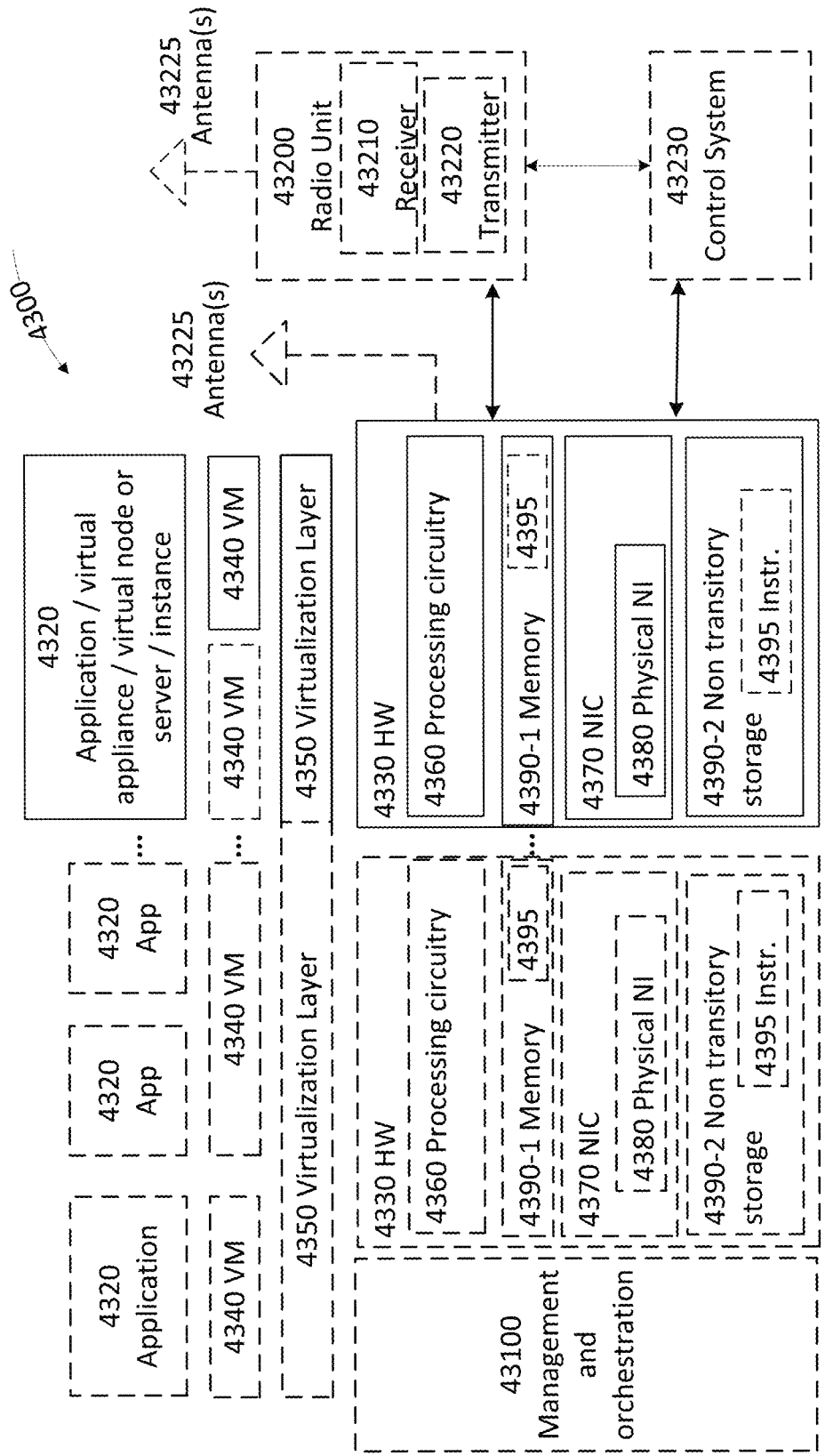
FIG. 16 is a block diagram of a virtualization environment in accordance with some embodiments.

FIG. 16 illustrates a virtualization environment in accordance with some embodiments.

FIG. 16 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 16, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 16.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 17:
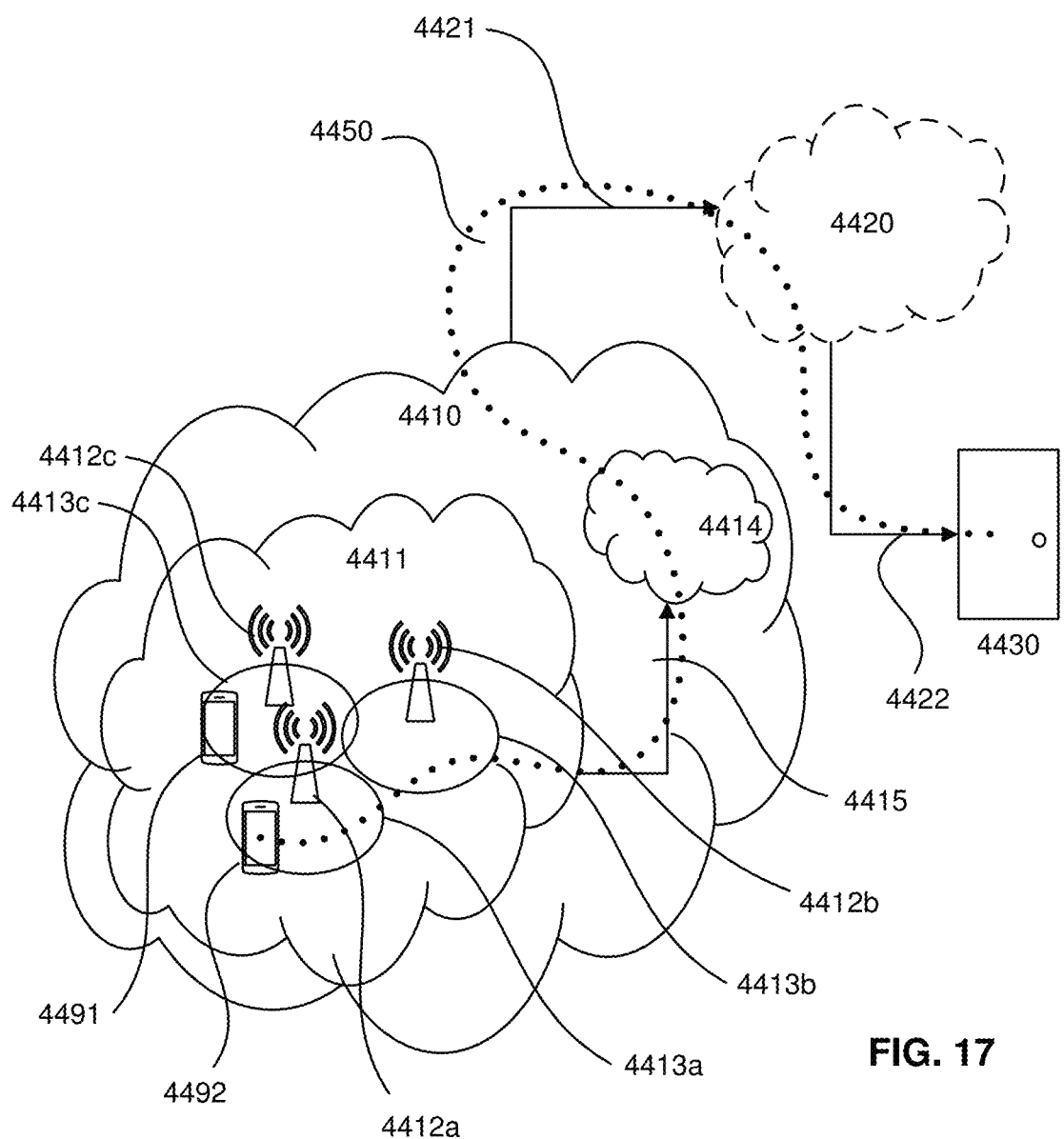
FIG. 17 is a block diagram of a telecommunication network connected via an intermediate network to a host computer in accordance with some embodiments.

FIG. 17 illustrates a telecommunication network connected via an intermediate network to a host computer in accordance with some embodiments.

With reference to FIG. 17, in accordance with an embodiment, a communication system includes telecommunication network 4410, such as a 3GPP-type cellular network, which comprises access network 4411, such as a radio access network, and core network 4414. Access network 4411 comprises a plurality of base stations 4412a, 4412b, 4412c, such as NBs, eNBs, gNBs or other types of wireless access points, each defining a corresponding coverage area 4413a, 4413b, 4413c. Each base station 4412a, 4412b, 4412c is connectable to core network 4414 over a wired or wireless connection 4415. A first UE 4491 located in coverage area 4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 17 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 18:
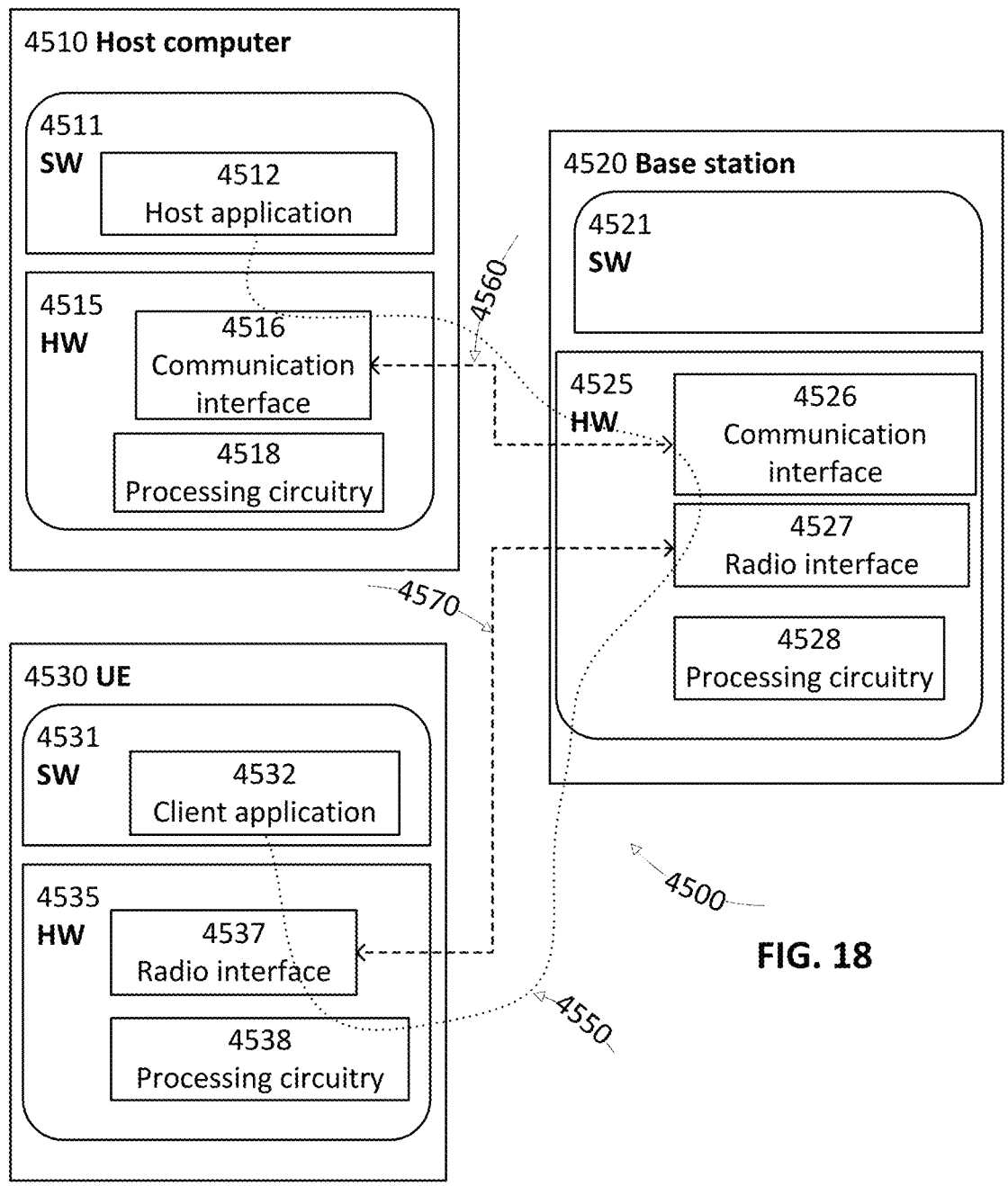
FIG. 18 is a block diagram of a host computer communicating via a base station with a user equipment over a partially wireless connection in accordance with some embodiments.

FIG. 18 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 18. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 18) served by base station 4520. Communication interface 4526 may be configured to facilitate connection 4560 to host computer 4510. Connection 4560 may be direct or it may pass through a core network (not shown in FIG. 18) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 18 may be similar or identical to host computer 4430, one of base stations 4412a, 4412b, 4412c and one of UEs 4491, 4492 of FIG. 17, respectively. This is to say, the inner workings of these entities may be as shown in FIG. 18 and independently, the surrounding network topology may be that of FIG. 17.

In FIG. 18, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figure 19:
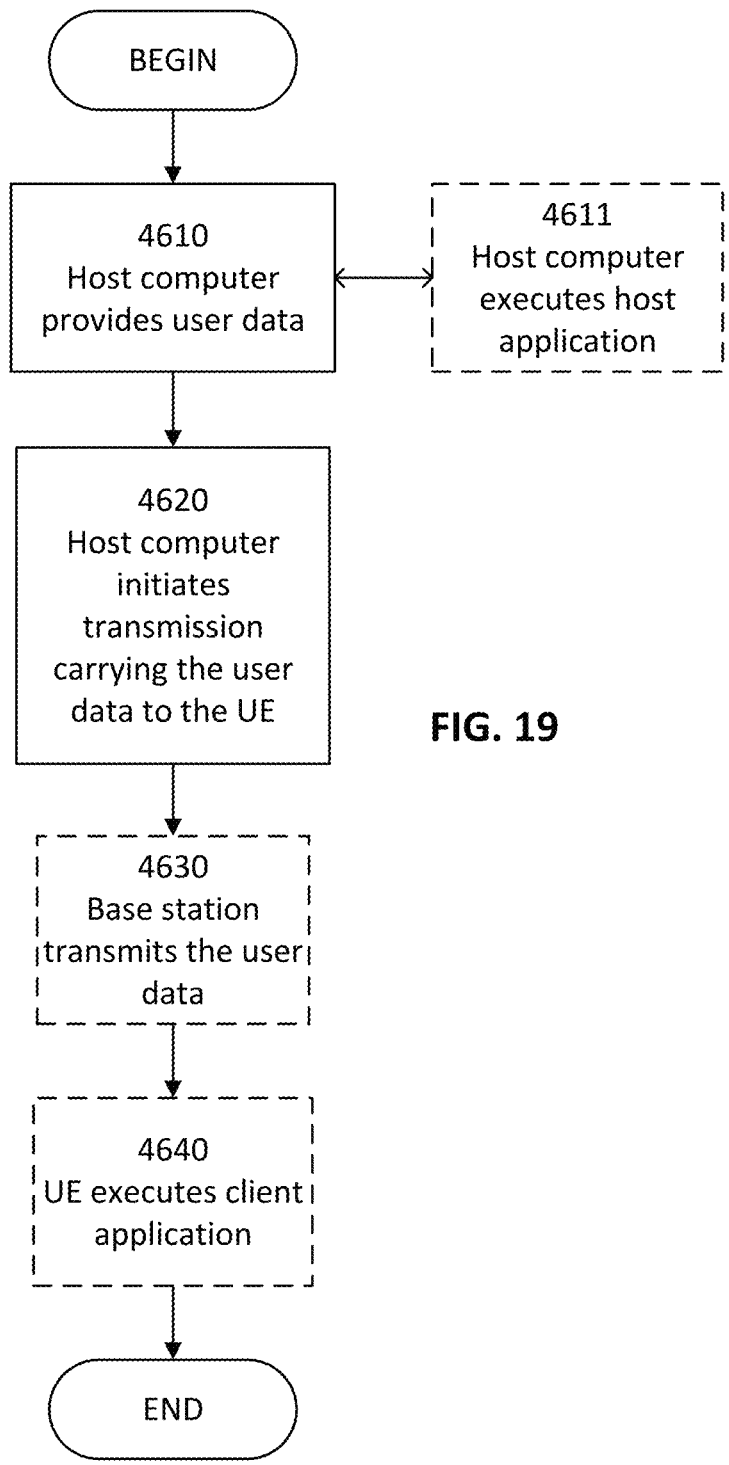
FIG. 19 is a block diagram of methods implemented in a communication system including a host computer, a base station and a user equipment in accordance with some embodiments.

FIG. 19 illustrates methods implemented in a communication system including a host computer, a base station and a user equipment in accordance with some embodiments FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

Figure 20:
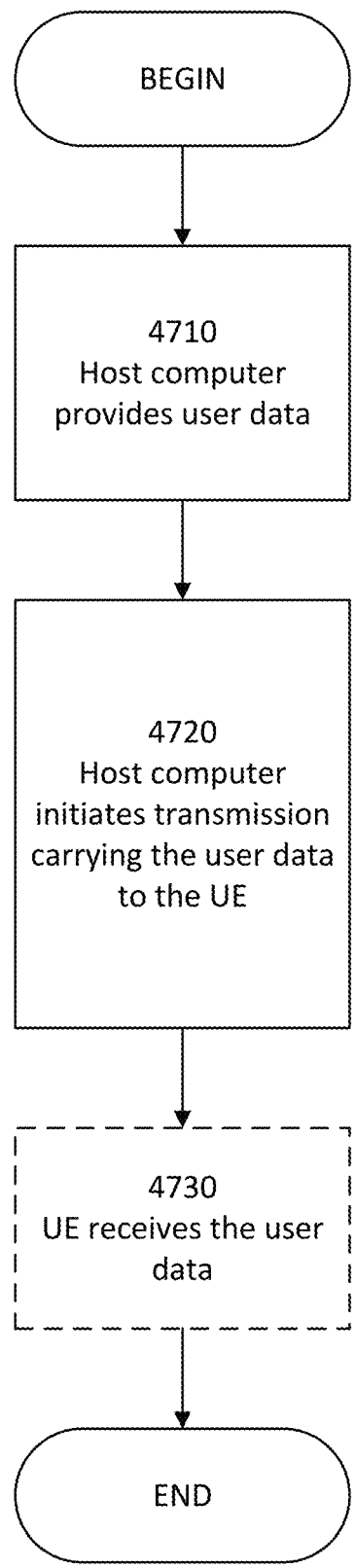
FIG. 20 is a block diagram of methods implemented in a communication system including a host computer, a base station and a user equipment in accordance with some embodiments.

FIG. 20 illustrates methods implemented in a communication system including a host computer, a base station and a user equipment in accordance with some embodiments.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

Figure 21:
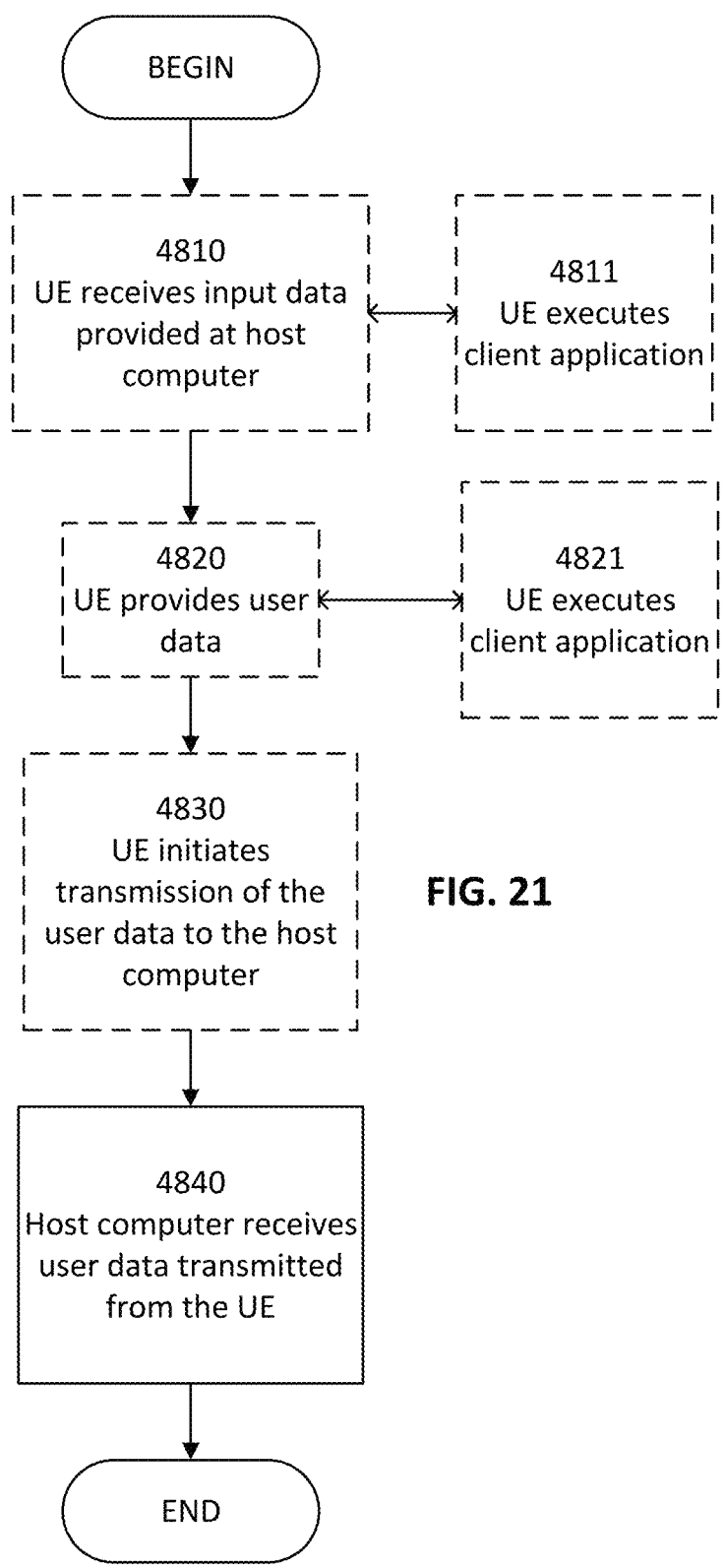
FIG. 21 is a block diagram of methods implemented in a communication system including a host computer, a base station and a user equipment in accordance with some embodiments.

FIG. 21 illustrates methods implemented in a communication system including a host computer, a base station and a user equipment in accordance with some embodiments.

FIG. 21 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 21 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

Figure 22:
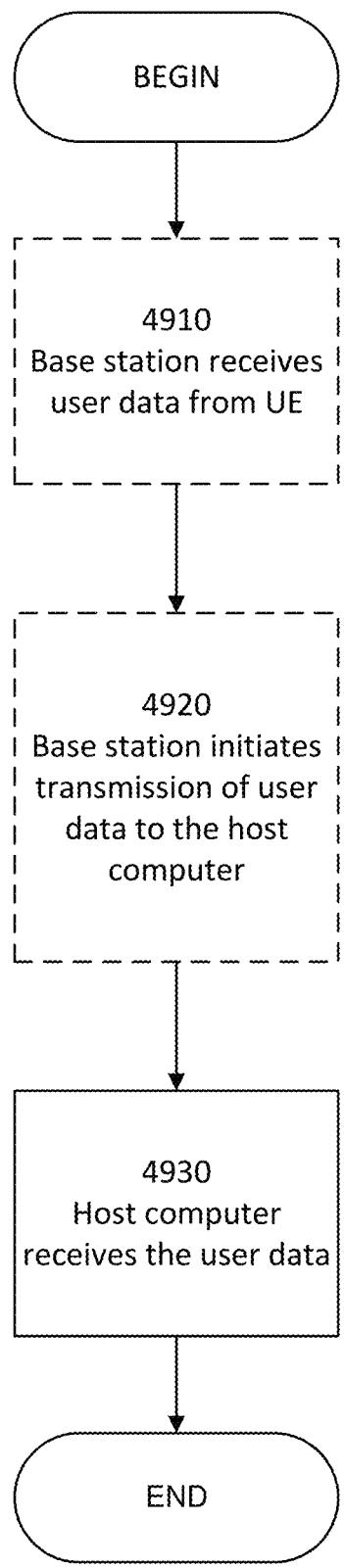
FIG. 22 is a block diagram of methods implemented in a communication system including a host computer, a base station and a user equipment in accordance with some embodiments.

FIG. 22 illustrates methods implemented in a communication system including a host computer, a base station and a user equipment in accordance with some embodiments FIG. 22 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 22 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1× RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access UTRAN Universal Terrestrial Radio Access Network
WCDMA Wide CDMA
WLAN Wide Local Area Network
AMF Access and Mobility management Function
NGAP Next Generation Application Protocol
RL ReLay
RM ReMote
PO Paging Occasion
ProSe Proximity Services
GUTI Globally Unique Temporary Identity Further definitions and embodiments are discussed below.

In the above-description of various embodiments of present disclosure, it is to be understood that the terminology used herein is for the purpose of describing particular embodiments only and is not intended to be limiting of present disclosure. Unless otherwise defined, all terms (including technical and scientific terms) used herein have the same meaning as commonly understood by one of ordinary skill in the art to which present disclosure belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present disclosure. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present disclosure may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of present disclosure. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present disclosure. All such variations and modifications are intended to be included herein within the scope of present disclosure. Accordingly, the above disclosed subject matter is to be considered illustrative, and not restrictive, and the examples of embodiments are intended to cover all such modifications, enhancements, and other embodiments, which fall within the spirit and scope of present disclosure. Thus, to the maximum extent allowed by law, the scope of present disclosure are to be determined by the broadest permissible interpretation of the present disclo-

The invention claimed is:

1. A method of operating a radio access network node to link a remote user equipment (RMUE) device to a relay user equipment (RLUE) device in a communications network, the method comprising:
   receiving a message from either of the RMUE device or the RLUE device that includes information corresponding to either the RMUE device or the RLUE device having a connection that is established between the radio access network node and the corresponding one of the RMUE device or the RLUE device and that uses a first access and mobility management function (AMF); and
   linking the RMUE device to the RLUE device using the first AMF, wherein linking the RMUE device to the RLUE device using the first AMF comprises modifying paging parameters of the RMUE device to be aligned with paging parameters of the RLUE device.

2. The method of claim 1, further comprising sending, to a core network, a message indicating that the first AMF includes data corresponding to the RLUE device or the RMUE device.

3. The method of claim 1, further comprising sending, to a core network, a registration message that includes information corresponding to the RLUE device.

4. The method of claim 1, wherein the RMUE device is registered with a core network based on the first AMF, and wherein the RLUE device is linked to the RMUE device using the first AMF based on the first AMF being used by the RMUE device.

5. The method of claim 1, wherein the RLUE device is registered with a core network based on the first AMF, and wherein the RMUE device is linked to the RLUE device using the first AMF based on the first AMF being used by the RLUE device.

6. The method of claim 1, further comprising unlinking the RMUE device and the RLUE device based on the RMUE device moving and becoming directly linked to the radio access network node.

7. The method of claim 6, further comprising sending a message to the first AMF that does not include information corresponding to the RLUE device.

8. The method of claim 6, wherein the first AMF corresponds to the RMUE device, and wherein the first AMF removes the link between the RMUE device and the RLUE device.

9. The method of claim 1, wherein a second AMF that is different from the first AMF corresponds to the RMUE device, wherein the second AMF retrieves the linking of the RLUE device, and
   wherein the first AMF removes the linking between the RMUE device and the RLUE device.

10. A radio access network (RAN) node comprising:
   processing circuitry; and
   memory coupled with the processing circuitry, wherein the memory includes instructions that when executed by the processing circuitry causes the RAN node to perform operations according to claim 1.

11. A method of operating a radio access network node to link a remote user equipment (RMUE) device to a relay user equipment (RLUE) device in a communications network, the method comprising:
   receiving a message from either of the RMUE device or the RLUE device that includes information corresponding to either the RMUE device or the RLUE device having a connection that is established between the radio access network node and the corresponding one of the RMUE device or the RLUE device and that uses a first access and mobility management function (AMF);
   linking the RMUE device to the RLUE device using the first AMF; and
   sending, to a core network, a registration message that includes information corresponding to the RLUE device, wherein the information corresponding to the RLUE device comprises a next generation application protocol identifier (NGAP ID) that corresponds to the RLUE device and an AMF identifier that corresponds to the RLUE device.

12. A method of operating a core network node to link a remote user equipment, RMUE, device to a relay user equipment, RLUE, device in a communications network, the method comprising:
   receiving, from a radio access network node and into a core network, a message indicating that a first AMF includes data corresponding to a RLUE device; and
   linking the RMUE device to the RLUE device based on the message, wherein linking the RMUE device to the RLUE device using the first AMF comprises modifying paging parameters of the RMUE device to be aligned with paging parameters of the RLUE device.

13. The method of claim 12, further comprising receiving, into the core network, a registration message that includes information corresponding to the RLUE device.

14. The method of claim 13, wherein the information corresponding to the RLUE device comprises a next generation application protocol identifier (NGAP ID) that corresponds to the RLUE device and an AMF identifier that corresponds to the RLUE device.

15. The method of claim 12, wherein the RMUE device is registered with the core network based on the first AMF, and wherein the RLUE device is linked to the RMUE device using the first AMF based on the first AMF being used by the RMUE device.

16. The method of claim 12, wherein the RLUE device is registered with the core network based on the first AMF, and wherein the RMUE device is linked to the RLUE device using the first AMF based on the first AMF being used by the RLUE device.

17. The method of claim 12, further comprising unlinking the RMUE device and the RLUE device based on the RMUE device moving and becoming directly linked to the core network node.

18. The method of claim 17, wherein the first AMF corresponds to the RMUE device, and wherein the first AMF removes the link between the RMUE device and the RLUE device.

19. The method of claim 17, wherein a second AMF that is different from the first AMF corresponds to the RMUE device, wherein the second AMF retrieves the linking of the RLUE device, and
   wherein the first AMF removes the linking between the RMUE device and the RLUE device.

20. A core network (CN) node comprising:
   processing circuitry; and
   memory coupled with the processing circuitry, wherein the memory includes instructions that when executed by the processing circuitry causes the CN node to perform operations according to claim 12.

* * * * *